United States Patent [19]

Atlas

[11] E Patent Number: Re. 33,152

[45] Reissued Date of Patent: Jan. 23, 1990

[54] RADAR DETECTION OF HAZARDOUS SMALL SCALE WEATHER DISTURBANCES

[76] Inventor: David Atlas, 7420 Westlake Ter., Bethesda, Md. 20817

[21] Appl. No.: 279,453

[22] Filed: Dec. 5, 1988

Related U.S. Patent Documents

Reissue of:

[64] Patent No.: 4,649,388
Issued: Mar. 10, 1987
Appl. No.: 812,442
Filed: Dec. 23, 1985

U.S. Applications:

[63] Continuation-in-part of Ser. No. 796,086, Nov. 8, 1985, abandoned.

[51] Int. Cl.[4] ..... G01S 13/95
[52] U.S. Cl. ..... 342/26
[58] Field of Search ..... 342/26

[56] References Cited

U.S. PATENT DOCUMENTS

| | | | |
|---|---|---|---|
| 3,340,528 | 9/1967 | Atlas | 343/5 W |
| 3,341,844 | 9/1967 | Sweeney | 342/26 |
| 3,491,358 | 1/1970 | Hicks | 342/26 |
| 3,573,824 | 4/1971 | Armstrong et al. | 342/26 |
| 3,646,555 | 2/1972 | Atlas | 342/26 |
| 3,715,748 | 2/1973 | Hicks | 343/5 W |
| 3,735,333 | 5/1973 | Balser et al. | 343/5 W X |
| 4,015,257 | 3/1977 | Felter | 342/26 |
| 4,223,309 | 9/1980 | Payne | 342/26 |
| 4,389,648 | 6/1983 | Lumscombe et al. | 342/104 |
| 4,404,561 | 9/1983 | Mulder et al. | 342/147 |

OTHER PUBLICATIONS

T. T. Fujita, "Analysis of Storm-Cell Hazards to Aviation as Related to Terminal Doppler Radar Siting and Update Rate", Dept. of Geophysical Sciences, University of Chicago, SMRP Research Paper 204, 1983.

W. David Zittel, "An Aviation Composite Hazards Product" Second International Conference on the Aviation Weather System, Jun. 19-21, 1985.

J. W. Wilson et al., "Microburst Wind Structure and Evaluation of Doppler Radar for Airport Wind Shear Detection", *Journal of Climate and Applied Meteorology*, 1984, vol. 23, pp. 898-995.

John W. Taylor, "Design of a New Airport Surveillance Radar (ASR-9)", *Proceedings of the IEEE*, Feb. 1985, vol. 73, pp. 284-289.

Committee Report on "Low Altitude Wind Shear and its Hazard to Aviation" Nat. Academy Press, Wash. D.C., 1983.

*Primary Examiner*—Thomas H. Tarcza
*Assistant Examiner*—Gilberto Barrón, Jr.
*Attorney, Agent, or Firm*—Brady, O'Boyle & Gates

[57] ABSTRACT

The detection and warning of microbursts, low level wind shear, and other weather disturbances, which are hazardous to aircraft operations and to the public at large, are accomplished with either an airport surveillance radar (ASR) or a multi-beam Doppler radar. ASR Doppler systems normally operate to receive one of two relatively large vertical fan beams having different elevation angles but which overlap one another so that they have equal gains at an elevation angle, called the null, at a relatively low angle, for example 5°. Below this null, the low beam antenna gain exceeds that of the high beam, and conversely above it. Accordingly, by subtracting the high beam Doppler spectrum from that on the low beam, a Difference Doppler Spectrum (DDS) is produced which is positive below the null and negative above. The velocity bounds of the positive portion of the DDS provide the wind speed components at the null and at heights near the surface. These wind speed components are then utilized to measure and map radial and horizontal shear, the boundaries of the disturbance and other signatures such as vertical shear and turbulence and the rate of change of all the parameters, thereby permitting the detection of the location and track of the disturbance. A multi-beam Doppler radar can be utilized to perform similar functions of measuring the mean Doppler velocity, Doppler spectral breadth, and reflectivity simultaneously at all elevations. Both systems provide effective enhancements in signal to clutter ratio through pattern recognition and motion detection.

57 Claims, 12 Drawing Sheets

RECEIVER H
TO 48
44
S5b
TRANSMITTER
30
S5a
RECEIVER L
42
TO 46
HIGH BEAM
40
32
36
34
LOW BEAM
38
TRANSMITTER
70
S6
S3a
76
72
74
HIGH BEAM
78
LOW BEAM
80
RECEIVER & DOPPLER PROCESSOR
82
S3b
MEASURE ECHO POWER
86
TO S3c 94
84
LOW BEAM
HIGH BEAM
BUFFER STORAGE
92
TO S4b
TO S4a

RADAR DETECTION OF HAZARDOUS SMALL SCALE WEATHER DISTURBANCES

Matter enclosed in heavy brackets [ ] appears in the original patent but forms no part of this reissue specification; matter printed in italics indicates the additions made by reissue.

CROSS REFERENCE TO RELATED APPLICATION

This application *is a reissue of U.S. Pat. No. 4,649,388, issued Mar. 10, 1987 for RADAR DETECTION OF HAZARDOUS SMALL SCALE WEATHER DISTURBANCES, which* is a continuation-in-part of prior copending application Ser. No. 796,086, filed Nov. 8, 1985 for RADAR DETECTION OF HAZARDOUS SMALL WEATHER DISTURBANCES, and now abandoned as of the filing date of this application.

BACKGROUND OF THE INVENTION

This invention relates generally to the detection of weather disturbances which are particularly hazardous to aircraft during takeoff and landing and more particularly to the radar detection of the location and intensity of microbursts and the resulting low level wind shear, as well as wind gust fronts, tornado vortices and their antecedent mesocyclones.

Although there are existing and contemplated techniques for radar detection of potentially hazardous weather disturbances, they are known to require the use of special dedicated narrow beam Doppler weather radars. A 1984 publication entitled, "Microburst Wind Structure And Evaluation of Doppler Radar For Airport Wind Shear Detection" by J. W. Wilson, et al., which appeared in the Journal of Climate and Applied Meteorology, Vol. 23, at pp. 898–995, discloses one such an approach. However, no known solution exists to date for integrating the detection of the aforesaid weather disturbances, particularly low level wind shear, into radars used primarily for airport surveillance which by design have one or more relatively large vertical fan beams. A typical example of this type of radar is disclosed in a publication entitled, "Design of a New Airport Surveillance Radar (ASR-9)" by John W. Taylor, et al., which appeared in the Proceedings Of The IEEE, Vol. 3, No. 2, February, 1985, pp. 284–289.

Accordingly, it is an object of this invention to provide an improvement in the detection of certain weather disturbances.

It is another object of this invention to provide an improvement in the radar detection of certain weather disturbances which are accompanied by relatively violent winds in a small locality.

It is still another object of this invention to provide an improvement in the radar detection of microbursts, low level wind shear, wind gust fronts, tornado vortices, and mesocyclones.

It is yet another object of this invention to provide for the detection and indication of the position as well as determining the intensity of microbursts and the associated low level wind shear and turbulence which are particularly hazardous to aircraft during takeoff and landing.

SUMMARY

Briefly, the foregoing and other objects are accomplished by a method and apparatus for use in connection with airport surveillance Doppler radars having at least two relatively wide vertical fan beams whose patterns overlap one another and wherein the main lobe of one of the beams is directed at an elevation angle lower than that of the other and has an antenna gain exceeding that of the other at all elevations below a prescribed elevation angle where the gains are equal. Above this equal gain or null level, the gain of the second or upper beam exceeds that of the lower. The Doppler velocity spectra on both beams are then measured essentially simultaneously. In a first method a difference Doppler spectrum is obtained by subtracting the high beam spectra from the low beam spectra which will be positive at angles below the null level and negative above. Accordingly, the Doppler velocities encompassed by the positive segment of the difference Doppler spectrum represent the velocities of the wind components at elevation angles lower than the null level. The velocity which is found where the difference Doppler spectrum crosses, from positive to negative is the wind component at the null level. Assuming that the wind varies monotonically with height, the velocity bounds at or near the other extreme of the positive portion of the difference Doppler spectrum corresponds to the speed of near surface level wind. The radial gradient or derivative of the wind speeds provides an indication of the wind shear that is associated with a microburst or similar phenomenon. The wind shear is displayed and when it exceeds a prescribed level, an alarm can be generated, when desired. In a second method, the ratio of the low beam spectra to the high beam spectra is obtained to generate a ratio Doppler spectrum from which the velocity bounds referred to above are determined where the ratio Doppler spectrum is equal to or exceeds unity. In a third method a normalization process of the Doppler spectra in the beams is effected prior to generating either the difference Doppler spectrum or the ratio Doppler spectrum.

This invention also provides for the measurement of the vertical shear of the wind in the lower layer of the atmosphere, the tangential shear of the near surface wind, the turbulence of the near surface wind, and the difference between the average reflectivities in the high and low beams. Inasmuch as each of these parameters is related to one or more of the small scale weather hazards of interest, in addition, the time rate of change of these parameters, as measured during a sequence of antenna scans, provides a probable precursor signature of the onset of an incipient hazard. Similarly, the display of the parameters themselves, or their scan to scan differences on a sequence of scans provides a clear and unambiguous indication of the location, track and rate of evolution of the hazardous region.

An alternative method and apparatus involves the use of a plurality of vertically stacked narrow beams which permits the measurement of radar reflectivity, mean Doppler velocity, and Doppler spectrum breadth simultaneously at all corresponding elevations. The mean Doppler velocity on the lowest beam may be operated upon in every respect, as was the near surface wind velocity in the wide beam embodiment to provide the desired detection and warning capabilities. Moreover, the vertical shear and vertical reflectivity gradient may be determined more accurately and employed in a manner similar to that for the wide beam embodiment.

BRIEF DESCRIPTION OF THE DRAWINGS

While the present invention is defined in the claims annexed to and forming a part of the specification, a better understanding can be had by reference to the following description when taken in conjunction with the accompanying drawings in which:

FIG. 2A is a top elevational view of another illustrative example of the strongly sheared wind field resulting from microbursts, while

DETAILED DESCRIPTION OF THE INVENTION

Figure 1A:
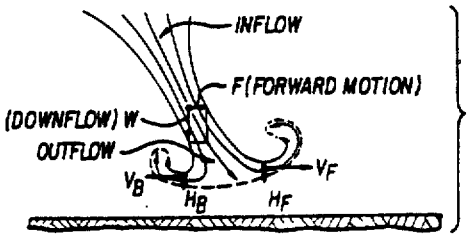
FIGS. 1A and 1B are side and top elevational views diagrammatically illustrative of a microburst and the associated wind shear.

This invention discloses a method as well as apparatus by which one may use a relatively large elevational beam Doppler radar such as that employed for airport surveillance for the detection of downbursts, also referred to interchangeably as microbursts, as well as the detection and mapping of tornado vortices and their antecedent mesocyclones. Mesocyclones are the larger rotating vortices of the order of a few kilometers in diameter which often accompany thunderstorms and precede tornadoes. The radar, however, should preferably have sufficient sensitivity to detect microbursts which may have equivalent reflectivities as low as 5 dBZ out to about 15 Km range. It should be noted that dBZ is a well known unit of reflectivity of meteorological targets. A reflectivity of 5 dBZ is about the average for dry microbursts. It is preferable that the radar be able to detect even smaller reflectivities and measure their associated velocities. While the present invention is particularly adapted for use with an airport surveillance radar, the ASR-9 referred to in the above referenced publication being as an illustrative example and incorporated herein by reference, it is not meant to be restricted thereto.

In particular, this invention also pertains to the use of a system utilizing a multiplicity of narrow beams.

One of the primary Doppler radar signatures to be detected in a microburst induced low level shear is the radial velocity gradient $\Delta V/\Delta r$. This gradient may reach values as high 40 m/s (about 80 Knots) in 2 Km and may occur in a region as small as 1 Km. Schematic diagrams of microbursts and associated divergence patterns generating wind shear are shown in FIGS. 1A–1B and 2A–2C. This type of phenomenon was described in 1983 by T. T. Fujita in a publication entitled, "Analysis of Storm-Cell Hazards To Aviation As Related To Terminal Doppler Radar Siting and Update Rate", Dept. of Geophysical Sciences, University of Chicago, SMRP Research Paper 204, as well as the aforementioned Wilson, et al. publication. It is to be noted that the divergence as shown in FIG. 1B is not necessarily circularly symmetrical so that a single radar beam will discern only that component of the divergence which is along the line between the radar and microburst. As has become very evident of late, undetected low level shear is particularly hazardous to aircraft in takeoff or landing when the sudden encounter of a wind shift in the same direction as flight causes the aircraft to lose lift. The primary Doppler radar signature of a mesocyclone is the tangential or circumferential shear of the radial velocity as the radar beam moves across its vortex observing a sharp change in radial components associated with the rotating winds on either side of the axis of the vortex. In the case of tornado vortices, a similar signature will occur with a larger tangential shear when the vortex diameter is larger than the beamwidth. If not, the primary signature of the tornado vortex is an extremely broad width of the Doppler spectrum associated with the simultaneous presence of both very large receding and approaching velocities in the radar pulse volume.

A problem which makes low level shear in and around the vicinity of an airport particularly difficult to detect by radar is that the maximum horizontal shear often occurs at heights below 100 m above ground level (AGL). This requires that the radar be sufficiently close to the microburst that it is within the radar's horizon. It also implies that the radar be located at or near the airport so that the radar can provide detection capability at such low levels out to sufficient radius, e.g. 15 to 20 Km, to assure that a microburst which occurs off to one side may not propagate into the runway areas without advance notice.

It is therefore vital that the radar be able to direct sufficient energy to the weather disturbance at the lowest possible angle to detect the low level shear. Also, the radar must have excellent ground clutter rejection for two primary reasons: (1) it must be able to detect weakly reflecting dry microbursts against ground clutter in close proximity to the radar and airport; and (2) ground clutter echoes may bias Doppler velocity measurements severely thereby causing errors in the measurement of radial shear. Airport Surveillance Radar Doppler radars fit the requirements stated above in several important ways: (1) they have excellent sensitivity; (2) they are usually located at the airport; and (3) they generally have excellent clutter rejection.

In the case of the weakly reflective dry microburst or other hazardous weather phenomena, the existing clutter rejection may still be inadequate. This invention, therefore, provides methods of attaining effectively greater clutter rejection. In addition the critical weakness of the present ASR radars, such as the aforementioned ASR-9 Doppler radar, for detecting microbursts, wind shear and other violet localized disturbancesis its relatively large vertical beam having a cosecant square radiation pattern which is designed to detect and track aircraft in an airspace below 25,000 ft. and within 40 to 60 nmi of the airport. Since this broad vertical beam also views storm systems at all angles up to about 35 degrees, the Doppler spectrum will be relatively very broad. Even with a uniform wind speed, v, across the depth of the beam, the measured doppler velocities will range from approximately v to v cos 35° or from v to about 0.8 v. Add to this particle fall speeds, wind shear, turbulene, and other spectrum broadening factors, and the weighting of the echoes by both the beam illumination pattern and the vertical reflectivity distribution, makes the Doppler spectrum exceedingly broad. Under these circumstances, the radial variation of mean Doppler velocity may be a meaningless measure of the radial shear near the surface.

Figure 3:
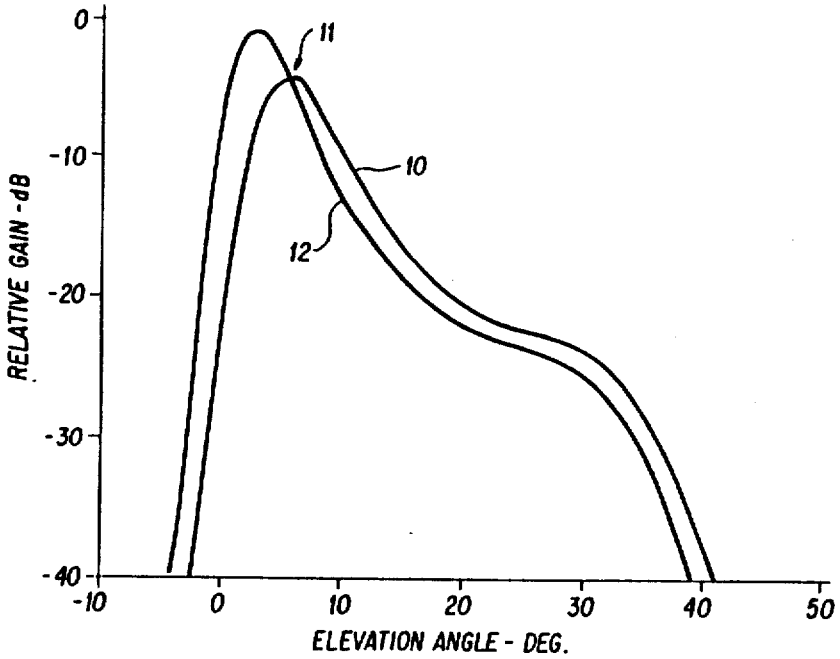
FIG. 3 is a diagram illustrative of a typical gain characteristic of a dual beam airport surveillance radar system.

The present invention overcomes the above noted limitations in its preferred form by measuring the Doppler velocities associated with targets near the surface, the "near the surface" being defined as heights below about 1 Km and determining these velocities in the Doppler spectrum from the difference in the Doppler spectra on two separate beams which receive echoes simultaneously or consecutively and whose radiation patterns 10 and 12 overlap in the vertical as shown in FIG. 3.

Figure 4A:
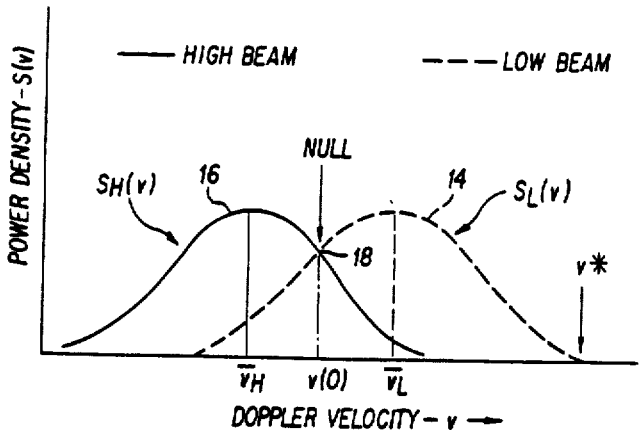
FIGS. 4A and 4B are a set of characteristic curves helpful in understanding the invention.
Figure 4B:
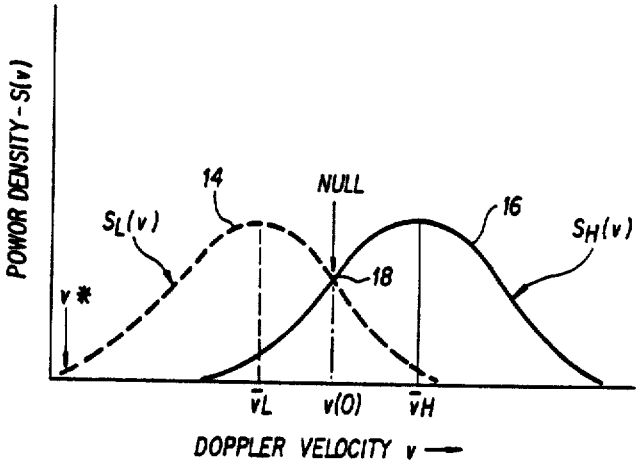

This process illustrated schematically in FIGS. 4A and 4B where the Doppler spectra associated with the low (L) and high (H) beams, $S_L(v)$ and $S_H(v)$, respectively, are plotted and which are shown by the curves 14 and 16. This description assumes that the reflectivity is constant with height across the two beams. Note that the null level 18 i.e. where $S_L(v)=S_H(v)$ occurs at a specific velocity v(0). In the simplest case where the wind varies monotonically with height, the velocity axis also corresponds to a height axis. Accordingly, $S_L(v)=S_H(v)$ at an elevation angle or height at which the beam gains of the two beams are equal, i.e. $G_L(h)=G_H(h)$, where h=height, as shown by reference numeral 11 in FIG. 3. Switching from low beam to high beam, those velocities which disappear or at which the spectral densities are reduced must be associated with the altitudes below the null where the low beam gain, $G_L(h)$, exceeds that of the high beam $G_H(h)$. In FIG. 4A, it can be seen that the velocities at which $S_L(v)$ exceeds $S_H(v)$ are large. This is confirmed also by the fact that the mean Doppler velocity $\bar{v}_L$ on the low beam exceeds that on the high beam, i.e. $\bar{v}_H$. Accordingly, the velocities which occur below the null level are those to the right of or larger than that of the null. In this case, the largest velocity in the low beam spectrum 14 is that at the right hand bound v* of $S_L(v)$. With velocity varying monotonically with height, v* would be the radial component of the wind speed near the surface. In FIG. 4B, analogous reasoning shows that the spectral densities are larger in the low beam at velocities smaller than that at the null leading to the conclusion that the radial velocity component is increasing with increasing height, as confirmed by the fact that the means Doppler velocity $\bar{v}_L$ in the low beam is less than that $\bar{v}_H$ in the high beam. In this case, the near surface wind velocity v* is at the left hand bound of the low beam spectrum 14.

For a microburst the low level wind shear is in the radial shear of the near surface wind as determined from the gradient of v* observed at a series of adjacent range bins. Other signatures of v* and v(0) which are related to microbursts and low level wind shear also provide a way in which vertical wind shear, tornado vortices and mesocyclones may be detected. The following discussion shall clarify this process and describe the methods by which it may be achieved.

The process may be explained mathematically and graphically as follows. Let Z(h) be the vertical distribution of reflectivity with height, h. At any range, the vertical illumination pattern may be expressed in terms of its gain function. Accordingly, the echo power returned to the antenna from any height increment between height h and h+dh and from any range bin can be expressed as:

$$S(h)dh=G(h)Z(h)dh \tag{1}$$

This function, however, is not measurable with a wide vertical beam. All that can be measured is the total echo power $$P=\int_0^{h(t)} G(h)Z(h)dh \tag{2}$$

where the limits on the integral are the surface height h=0 and echo top, h(t). It is implicit that the echo power within the horizontal width of the beam is also integrated. One can also measure $\bar{v}$ and $\sigma_v^2$; however, these values have very little physical significance with wide beams. While S(h) cannot be measured with a wide beam radar, the Doppler spectrum as a function of Doppler frequency shift, $f=2v/\lambda$, where v is the target Doppler velocity and $\lambda$ is the wavelength, can be determined. If the target velocity is a single valued function of height, h, i.e.

$$v=f(h) \tag{3}$$

then the height coordinate, h, may be transformed to the Doppler velocity coordinate, v, through Eq.(3). By employing the equality $$S(v)dv=S(h)dh \tag{4}$$

Eq. (1) can be stated as:

$$S(v)=Z(h)G(h)\,|dh/dv| \tag{5}$$

and comprises the Doppler spectrum which can be determined. It should be noted that the factor |dh/dv| simply transforms the height scale so that the magnitude of the echo power which is returned from the height interval h to h+dh appears in the velocity interval v to v+dv. Thus if the wind varies linearly with height, then dh/dv is constant and the Doppler velocity scale is simply a constant times the height scale. On the other hand, if the wind varies non-linearly with height, then the velocity scale is compressed or expanded variably along the height scale.

Since echo power is always a positive quantity, the quantity |dh/dv| is stated as an absolute value. This is important because one of the crucial aspects of this invention is that it permits a determination of whether the wind is stronger at low levels than at high levels, in spite of the fact that the sign of (dv/dh) may be positive or negative; i.e. increasing upward or downward, respectively.

If a relative narrow vertical beam were utilized such that $G(h)=G_0(h)$, where $G_0(h)$ is essentially the axial gain of the antenna, then it would make sense to measure the mean Doppler velocity as the beam scanned vertically. In that case, the variation of mean Doppler velocity with scan angle or height would provide the vertical profile of v with h given by Eq. (3). Similarly, the echo power at each height would be given by Eq. (2) from which one could recover the reflectivity profile Z(h). As it is, however, all that is available is the measured Doppler spectrum and knowledge of the antenna pattern. This leaves two unknowns in Eq. (5), i.e. Z(v) and $|dh/dv|$, or $v=f(h)$, thus precluding the determination of either the desired wind velocities or their heights.

In the preceding and subsequent discussion it should be noted that when a radar is used in a monostatic manner, the antenna gain function G(h) simply refers to the standard radiation pattern of the antenna, where $h=R\tan(EL)$, (EL) being the elevation angle above the horizon and R the range. However, when the radar is used bistatically such that transmission occurs on one beam and reception on another, then G(h) is the effective antenna gain defined by $G(h)=[G_1(h)G_2(h)]^{\frac{1}{2}}$ where the subscripts 1 and 2 refer to the transmitting and receiving beams, respectively. In the case of the ASR-9, for example, transmission occurs on the low beam and reception is selectively either on the low beam or the high beam. Thus the effective gain function for the low beam is simply $G(h)=G_1(h)$, since $G_2(h)=G_1(h)$. This is shown as curve 12 in FIG. 3. On the other hand, the effective gain for the high beam is the square root of the product of the low and high beam gain functions as described above and shown as 10 in FIG. 3.

In the case of the wide beam airport surveillance radar such as the ASR-9, the two effective beams are as shown, for example, in FIG. 3. The axis of the effective high beam 10 is peaked at about 6° while that of the low beam 12 is peaked at about 2.5°. The gains are equal at about 5.0°. Below this level 11, and low beam 12 has considerably greater gain than the high beam 10. At 2.5° elevation, this difference is about 12 db. Above 6° the gain of the high beam 10 is typically 3 to 3.5 db greater than that of the low beam 12. In this invention, the exact differences are of little consequence since it is only important that the two beams 10 and 12 have significantly different gains and that the differences be of opposite sign at low and high elevations, and that the equal gain angle not be more than a few degrees above the surface.

With the foregoing in mind, and utilizing a dual beam Doppler radar having antenna beam characteristics like that shown in FIG. 3, a first method of this invention calls for forming the difference in the Doppler spectra on the two beams. Using Eq. (5) for each of the beams, for example, beams 12 and 10, the following expression results:

$$S_L(v)-S_H(v)=(G_L-G_H)Z(h)\ |dh/dv| \qquad (6)$$

where the subscripts L and H represent low and high beams, respectively. Hereafter, the term $G_L-G_H$ is referred to as the "differential gain" (DG). Since reflectivity is positive, the difference spectrum is exactly zero at the height, i.e. elevation angle, at which $G_L=G_H$. This is the null level as shown by reference numeral 11 in FIG. 3. At low altitudes, below the null level, DG is positive and the difference spectrum is also positive; and conversely for heights above the null level, the difference spectrum is negative. Since DG can only be positive at low elevation angles, one may simply identify or associate the Doppler velocities in the positive portion of the difference spectrum with low altitudes. For example, in the case of the ASR-9 radar, this would be below 5.0° elevation. Of course, one may adjust or design the beams so that the null level occurs at lower elevation angles. Indeed, this would be preferable for the detection of low level winds and wind shear. However, such an alteration might compromise the aircraft detection and tracking function of the radar. In any event, a method now becomes available for measuring radial velocities of winds in a storm cell within a prescribed altitude region with a radar having two large beams having a relatively wide beamwidth.

Alternatively and in accordance with a second method of this invention, the ratio of the low beam spectrum to that on the high beam is formed instead of the difference. Whether the reflectivity is constant or varies with height, the ratio of the two Doppler spectra, is defined as the Ratio Doppler Spectrum (RDS). RDS will exceed unity whenever $G_L>G_H$, will equal unity where $G_L=G_H$ (i.e. the null level), and will be less than unity where $G_L<G_H$. In short, the same objective may be achieved by forming either the Difference Doppler Spectrum (DDS) or the Ratio Doppler Spectrum (RDS) between the two beams.

Considering now the effect of the reflectivity profile Z(h) in equations (1) and (6), Z(h) appears as a multiplier of the antenna gain difference pattern (DG). Accordingly, if the profile of Z(h) increases downward, then it will enhance the positive DG portion; however, if Z(h) increases upward, it will degrade this difference. In the case in which Z(h) approaches zero in the zone below the null, both $S_L(v)$ and $S_H(v)$ will approach zero and the DDS will also approach zero. Then, the positive portion of the DDS may become negligibly different from zero. On the other hand, if Z(h) simultaneously becomes larger above the null, it will enhance the negative portion of the DDS, thus sill permitting one to identify the null.

In order to maintain a relatively constant ability to identify the null and the positive region of the DDS, a third method of this invention involves the concept of normalizing the spectra of the two beams. This involves multiplying the low beam spectra by the fractional power, i.e. that portion of the sum of the two spectra which resides in the high beam, multiplying the high beam spectrum by the fractional power in the low beam. This technique, to be described below, compensates in large part for any vertical reflectivity gradient. It also maintains the levels of the DDS within a reasonable dynamic range. However, it is not necessary to the performance of this invention and accordingly may be resorted to if it fits the requirements of the user as an alternative operational mode.

The process by which one normalizes the spectra in the two beams is as follows. First the total power from each beam is measured as given by Eq. (2). The quantity G(h)Z(h) in Eq. (2) i the reflectivity-weighted vertical radiation pattern, and the Doppler spectrum in each beam is given by Eq. (5). The integral of (5) over the entire vertical extent of each beam is the area under each Doppler spectrum and is the total power. Thus the vertical gradient in the reflectivity profile is normalized by multiplying the low beam Doppler spectrum $S_L(v)$ by the ratio $P_H/(P_L+P_H)$ and the high beam spectrum $S_H(v)$ by $P_L/(P_L+P_H)$. These are called the normalized Doppler spectra $S_{Ln}(v)$ and $S_{Hn}(v)$ such that:

$$S_{Ln}(v) = S_L(v)\,[P_H/(P_L + P_H)] = F_H S_L(v) \tag{7}$$

$$F_H$$

and $$F_L \tag{8}$$

$$S_{Hn}(v) = S_H(v)\,[P_L/(P_L + P_H)] = F_L S_H(v)$$

The subscript n designates the term being "normalized". Accordingly, the normalized spectra are such that the low beam spectrum is enhanced by the fractional power of the two beams which is found in the high beam, and conversely. If reflectivity does not vary with height, then the power weighting factors $F_H$ and $F_L$ are equal and a situation similar to that previously discussed obtains.

In any case, it should be noted that the area of concern is with short ranges and altitudes below the differential gain null level which for the ASR-9 occurs at about 5.0°. At ranges less than about 15 Km, the height of this null is less than 1.3 Km. Thus Z would have to increase sharply upward to substantially degrade the methods just described even without normalization.

Figure 5A:
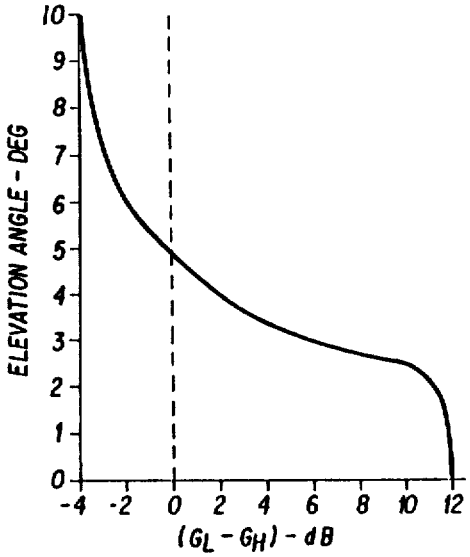
FIGS. 5A through 5C are another set of characteristic curves helpful in understanding the invention.
Figure 5B:
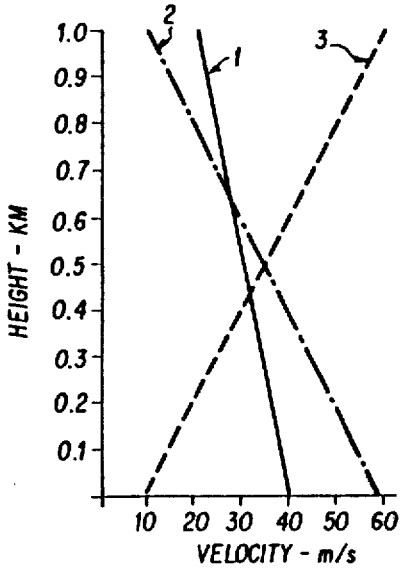
Figure 5C:
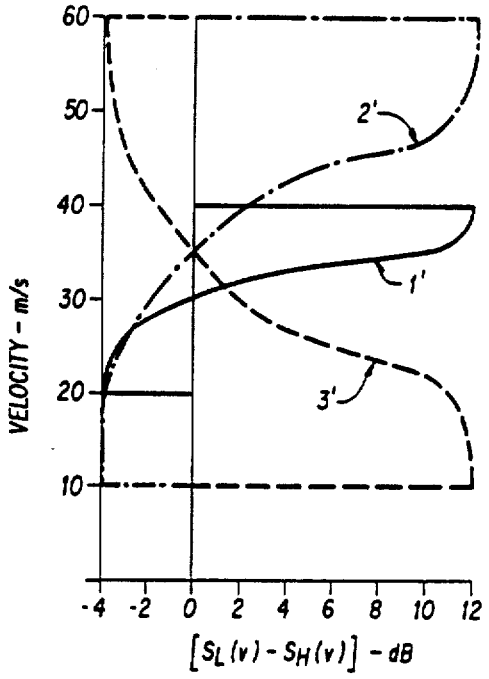

In order to clarify the inventive concepts further, reference is now made to FIGS. 5A through 5C. FIG. 5A is a graph illustrative of the vertical profile of the antenna gain difference characteristic of a high and low beam pattern such as shown in FIG. 3. The actual pattern is not critical as it is only important that the differential gain be as large as possible on both sides of the null 11 (FIG. 3) and that its vertical derivative near and across the null be large. In FIG. 5A, the DG is plotted versus elevation angle. In FIG. 5B an arbitrary altitude scale ranging from the ground up to 1 Km is shown corresponding to a specific range. Also in FIG. 5B, three velocity profiles of three different wind conditions 1, 2 and 3 are shown. The velocity profiles 1 and 2 decrease upwards while profile 3 increases upwards. Profile 3, moreover, has the same velocity range as profile 2 but with opposite shear. In order to compute the difference Doppler spectrum (DDS) it has been assumed that the reflectivity profile is constant with height and has a value of 10 Log Z=0 dBZ, or Z=1.

FIG. 5C is a plot of the difference Doppler Spectrum $S_L(v)-S_H(v)$ of the three velocity profiles. Note that the ordinate in FIG. 5C is the velocity scale which is a simple linear transformation of the height scale because v is linear with height in all three cases.

For profile 1, the corresponding difference Doppler spectrum (DDS) is shown by the solid curve 1' in FIG. 5C. It can be seen that positive values of the difference Doppler spectrum occur between 30 and 40 m/s because these velocities occur where the differential gain (DG) is positive. However, the entire DDS is compressed between 20 and 40 m/s because this is the range encompassed by velocity profile 1 in FIG. 5B. Curve 2' shown by the dot-dash line corresponds to the wind profile 2 in FIG. 5B and also exhibits a positive DDS at the larger velocities, i.e. in excess of 35 m/s, because these also occur below 1 Km where the differential gain is positive. Now, however, the upper bound of the DDS is 60 m/s, thus indicating that this is the greatest wind speed and that it occurs near zero height which is the surface of the earth. Considering curve 3' shown by the dashed line in FIG. 5C, it is positive at low velocities and negative at the high velocities indicating that the high speeds occur aloft where differential gain is negative above the null level. In this case the near surface wind velocity component v*=10 m/s corresponds to the non-null bound of the positive portion of the DDS.

Accordingly, it can be seen that one Doppler velocity in the differential Doppler spectrum can be identified as that occurring at DG=0 or null level. This velocity has already been defined as v(0). If the wind varies monotonically with height, then the other (non-null) bound of the positive DDS region is automatically the v* near the surface and represents the wind velocities which are sought to be determined.

In the event that the velocity profile is not monotonic with height, then the bounds of the positive region of the DDS will be v(0), that at the null level, and v(max) or v(min) at the level where the wind speed is a maximum or a minimum, respectively. As long as this occurs, in the positive DDS region, the level of v(max) or v(min) is known to be below that of v(0). Since short ranges typically less than 15 Km are of consideration and where the null level is at heights less than 1.3 Km, then v(max) or v(min) is known to occur somewhere below the null v(0). Thus there is little danger in designating v(max) or v(min) as the near surface wind velocity, v*. Indeed, it is exactly for this reason that v* has been called the "near surface" wind velocity; i.e. there are circumstances in which it will represent the wind at some level above the surface, but never higher than the height of the null. Also, the use of v* as the near surface wind will be advantageous in those situations where the microburst begins to diverge aloft rather than at the surface.

In summary, it is to be noted that: (1) the velocity v(0) which occurs at the level at which the DDS=0 or goes from positive to negative is the velocity at the null level; (2) the velocity v* at the other bound of the positive DDS region is a measure of the near surface wind velocity at some level below the null level; (3) the DDS is a compressed image of the DG pattern if the reflectivity Z is constant with height and v increases linearly with height, and the image is inverted if v decreases linearly with height; and (4) an approximate measure of the vertical wind shear is the velocity range encompassed by the positive side of DDS, v*−v(0).

There are a variety of means by which the Difference Doppler Spectrum (DDS) between the two beams, for example 10 and 12 (FIG. 3), can be obtained. If one can receive on only one beam at a time and has a single receiver and Doppler processor, one may switch the signals alternately from each beam into the processor, store the spectra, and subtract. However, this may not be desirable for a rapidly scanning antenna such as that of the ASR-9. Instead, both beams may be received simultaneously in which case each beam would have its own receiver and Doppler processor so that both the individual beam spectra and the DDS may be obtained simultaneously in real time. Two embodiments of such apparatus are disclosed in FIGS. 7 and 8 and will be considered subsequently.

One of the problems which needs to be addressed is the accuracy with which one may obtain the individual Doppler spectra and Difference Doppler Spectrum. Errors in estimating the spectral power density on each beam will be reflected in the DDS and its velocity bounds.

In the case of a discretely sampled waveform such as that available in a pulsed Doppler radar, one may obtain spectral estimates at M frequencies each of which is a multiple of the lowest frequency $f_0$ and which may be expressed by the relationship:

$$f_0 = 1/MT_S \quad (9)$$

where M is the number of samples in the sequence and $T_S$ is the interpulse period. In other words, the frequency resolution is simply the inverse of the total dwell time, $MT_S$. Since $f=2v/\lambda$, the velocity resolution $\Delta v$ can be stated as:

$$\Delta v = \lambda/2\ MT_S = \lambda(PRF)/2M \quad (10)$$

The maximum unambiguous frequency or Nyquist interval is $$f(max) = \pm(PRF)/2 \quad (11)$$

The corresponding maximum unambiguous Doppler velocity is then $$v(max) = \pm f(max)/2 = \pm\lambda(PRF)/4 \quad (12)$$

and the velocity resolution is simply $$\Delta v = 2\ v(max)/M \quad (13)$$

which is equivalent to Eq. (10).

In the ASR-9 radar, for example, there are eighteen pulses sampled per beamwidth. Then pulses are transmitted at a high PRF and eight at a lower PRF. Ten digital filters are used during the first burst of ten pulses and eight during the second burst of eight pulses. This dual PRF prevents blindness to Doppler frequencies close to integral multiples of the average PRF. In any case, at the high PRF of 1255 pulses per sec., the maximum unambiguous velocity interval is v(max)=33.6 m/s. With ten pulses and ten filters, the velocity resolution is thus 6.7 m/s. A separate filter bank of eight filters is used at the low PRF of 976 pulses per sec. with v(max)=26.1 m/s and $\Delta v$=6.5 m/s.

If a velocity resolution of 2 m/s (or approximately 4 Knots) is desired, the dwell time must be increased typically by a factor of about three. This may be achieved readily by sampling three times as long. A side effect of this is to increase the effective horizontal beamwidth from 1.4° to 4.2°. However, this is not too serious since at ranges less than 15 Km, the beamwidth would still be less than 1.2 Km. Since the effective Doppler velocity resolution and horizontal beam resolution are inversely related for a fixed PRF and scan rate, one may compromise by utilizing a factor of two. In this case the velocity resolution would be approximately 3.3 m/s and effective beamwidth would be 2.8°; i.e. less than 0.8 Km at ranges less than 15 Km. Whatever known form of the Doppler processor takes in the radar system, e.g. analog filters, digital filters, a Fast Fourier Transform of Discrete Fourier Transform, the number of equivalent filters would have to be increased by the same factor as the dwell time.

Because the boundes of the positive portion of the DDS must be determined with some precision, the Doppler spectra must be smoothed as much as possible with the allowable dwell time. This can be accomplished in several ways, namely: (1) average spectral estimates over several pulses widths either by decreasing the pulse width or by decreasing the net range resolution; (2) average spectral estimates from the same position on successive antenna scans; or (3) decrease the antenna scan rate to increase the dwell time. Unfortunately, the last approach is the least permissible because it tends to degrade the update cycle for aircraft tracking.

Velocity ambiguities or aliasing may occur in either or both the low and high beam Doppler spectra. However, except in the case in which the spectra are so wide as to cover the entire unambiguous velocity range given by Eq. (12), there should be little difficulty in resolving such ambiguities in the Difference Doppler Spectrum because the DDS will still have the proper polarity even where aliased. Accordingly, the aliased portion of the DDS may be properly located in the velocity domain.

Figure 1B:
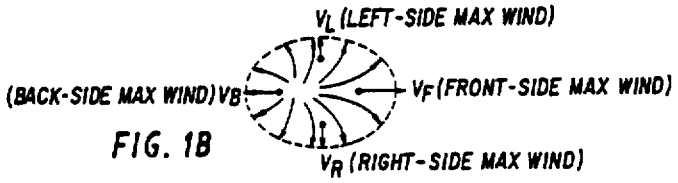

As can be seen with reference to FIGS. 1A and 1B when a microburst downdraft approaches the surface, it generally spreads out or diverges in all directions, although the diverging flow may not be circularly symmetrical. This means that the Doppler velocity will generally change signal upon crossing the axis of the microburst. However, this is not a necessary condition if the microburst is embedded in a strong background wind field. In that case, the outflow which opposes the wind direction will simply decrease the magnitude of the wind; however, the change in speed from one side of the microburst to the other, or the gradient, will be the same as that in the absence of a background wind. In short, a critical signature of the microburst and its low level wind shear is the gradient of speed as indicated by the radial change in the near surface Doppler velocity, the latter being determined in the manner previously described.

Figure 2A:
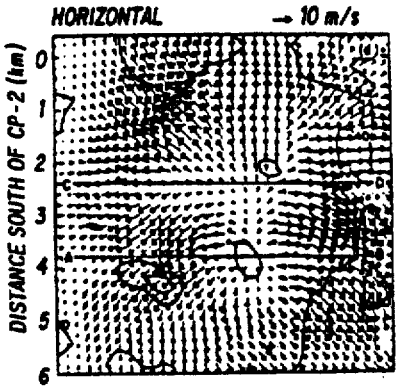
Figure 2B:
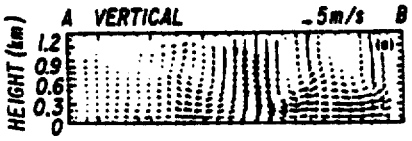
FIGS. 2B and 2C are side elevational views of the associated winds respectively occurring along the lines A–B and C–D of FIG. 2A.
Figure 2C:
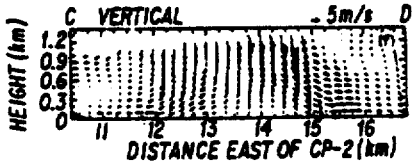

Referring back briefly to FIGS. 2A, 2B and 2C, there is depicted a microburst as observed by Wilson, et al. as set forth in the aforementioned publication. A dual Doppler radar system was used which permitted the determination of the vector velocity at each point in the area observed essentially simultaneously by both radars. Note that these vector winds have been computed from the Doppler observed winds after subtracting the mean wind speed in the environment. Also the horizontal cross-section at the top (FIG. 2A) corresponds to heights between 50 and 100 m above the ground. The vertical cross-section below, (FIG. 2B) corresponds to the section AB in FIG. 2A, while that in FIG. 2C corresponds to section CD. It can be seen that the maximum downdrafts of about 12 m/s are located in section AB at a position of about 14 Km east of the CP-2 radar and a height of 1 Km. Near the surface the horizontal speed is zero on the axis of the downburst, and increases to about 6 m/s directed oppositely on either side of the axis at a distance of about 1 Km. Thus a radar beam directed along the vertical cross section A-B of FIG. 2A would observe a v* signature such as that shown schematically by curve 20 in FIG. 6A. Without subtraction of the mean horizontal wind, the signature would simply be raised or lowered; however, the gradient between the receding and the approaching peaks would be preserved. In this case, it measures approximately 6 m/s per Km. It should be noted that the velocity profile (curve 20) in FIG. 6A actually corresponds to the mean Doppler velocity observed with a narrow beam radar. With a wide beam system such as an ASR-9, the radar beam might encompass the entire 1.2 Km depth seen in vertical sections A-B (FIG. 2B) and C-D (FIG. 2C). In such cases, one must employ the methods previously discussed to estimate v*, the Doppler velocity near the surface.

In addition, the Doppler spectrum breadth or the velocity width of the positive portion of the difference Doppler spectrum would generally be narrow on the axis of the microburst where the air velocity is downward and perpendicular to the radar. On either side of the axis one would find a broad Doppler spectrum as the air velocity vectors turn from downward with zero radial component to horizontal with near maximum radial component. With the typical flow pattern believed to exist in a microburst, the maximum breadth of the Doppler spectrum would be expected to occur on both sides of the axis at a position closer to the axis than the peak Doppler velocities shown by curve 20 in FIG. 6A.

Figure 6B:
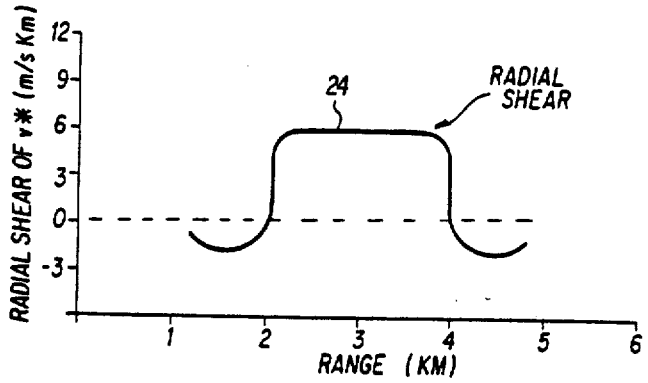
FIGS. 6A and 6B are still another set of characteristic curves helpful in understanding the invention.
Figure 6A:
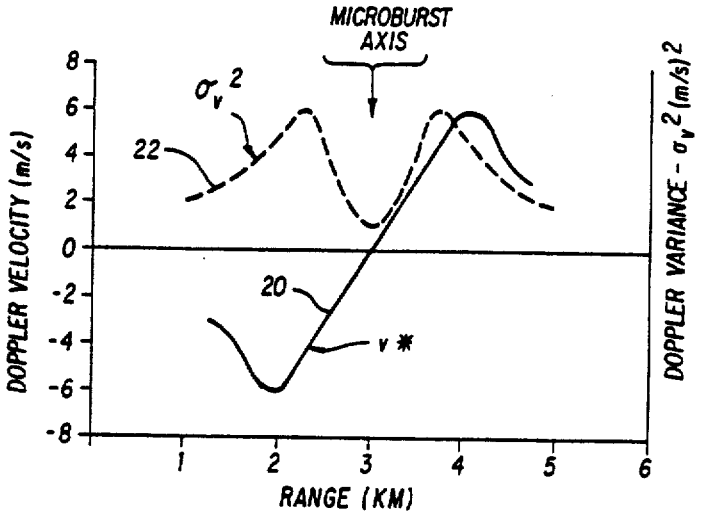

A schematic signature $\sigma_v^2$ of the expected variation in Doppler spread across the microburst is shown by the dashed curve 22 in FIG. 6A. The combination of a sharp radial gradient with a maximum Doppler breadth on either side of the axis is expected to be an excellent signature of the microburst and low level shear. Since strong flows cannot remain laminar near the surface, one should expect some variations from the idealized curves in FIG. 6A.

The breakdown of the high velocity outward flows near the surface would be manifested in turbulent variations of wind with range and azimuth and this low level turbulence could also be hazardous to aircraft. It is for this reason that the present method also includes a measurement of the root means square variations in v* in both range and azimuth. In addition, there will be statistical fluctuations superimposed upon both curves because weather echoes are naturally noisy and their moments also fluctuate. However, since radars which have narrow pulse lengths of about 1 microsec are being hypothetically utilized, about 7 estimates of each of the parameters per kilometer will be obtained. Thus the idealized curves of FIG. 6 should be regarded as a 2 to 4 point running mean of the unsmoothed estimates. Since ASR radars rotate rapidly, one may also obtain new parameter estimates every 4 or 5 sec and combine these with the previous estimates to provide more reliable profiles. However, this process should not be extended for more than 2 or 3 scans since the microburst may diverge very rapidly.

It is clear that a variety of algorithms can be employed to identify either or both signatures in FIG. 6A automatically. For example, one alternative method is to take the radial derivative of curve 20 shown in FIG. 6A. This is depicted as curve 24 in FIG. 6B. This comprises a direct measure of the low level shear across the microburst. If it exceeds a preset threshold, then an alarm may be triggered. If the derivative is not yet strong enough to constitute a hazard, a caution alarm may be initiated, thereby indicating the possibility of a developing microburst. Similarly an auxiliary algorithm may be established for the Doppler breadth signature. If there are two peaks in the latter which exceed prescribed thresholds and are located on either side of the microburst axis, as indicated by the shear, then one may also set off an alarm. Alternatively, one may require both conditions to be met before the alarm is sounded.

Strong low level winds are often associated with turbulent fluctuations of other winds which are potentially hazardous, e.g. hurricanes, chinook or foehn winds, strong extratropical cyclones, etc. The present invention therefore also contemplates methods to measure variability of the near surface wind, v*, which is associated with turbulence. This will be described subsequently.

Additional signatures of a microburst include: (1) the difference in the local vertical shear of the horizontal wind from that in the surrounding environment; and (2) the rapid time changes in this parameter as an incipient microburst develops and approaches the surface. This is based on the observation that microbursts often transport the horizontal momentum associated with the winds aloft down toward the surface. Therefore, in addition to the observation of the horizontal shear of the near surface wind associated with the diverging microburst, there should generally be a sharp difference in the vertical shear from that in the surrounding environment. Since the quantity $v(0)-v^*$ is an approximate measure of the vertical shear, a display of this quantity provides another indicator of a downburst. Moreover, because the vertical shear of the horizontal wind is likely to change rapidly during the development of an incipient microburst, a method of monitoring the time changes in the vertical shear is also included as part of this invention, thereby providing an earlier warning of an imminent downburst than may be available from the horizontal shear of the low level wind itself.

Figure 7A:
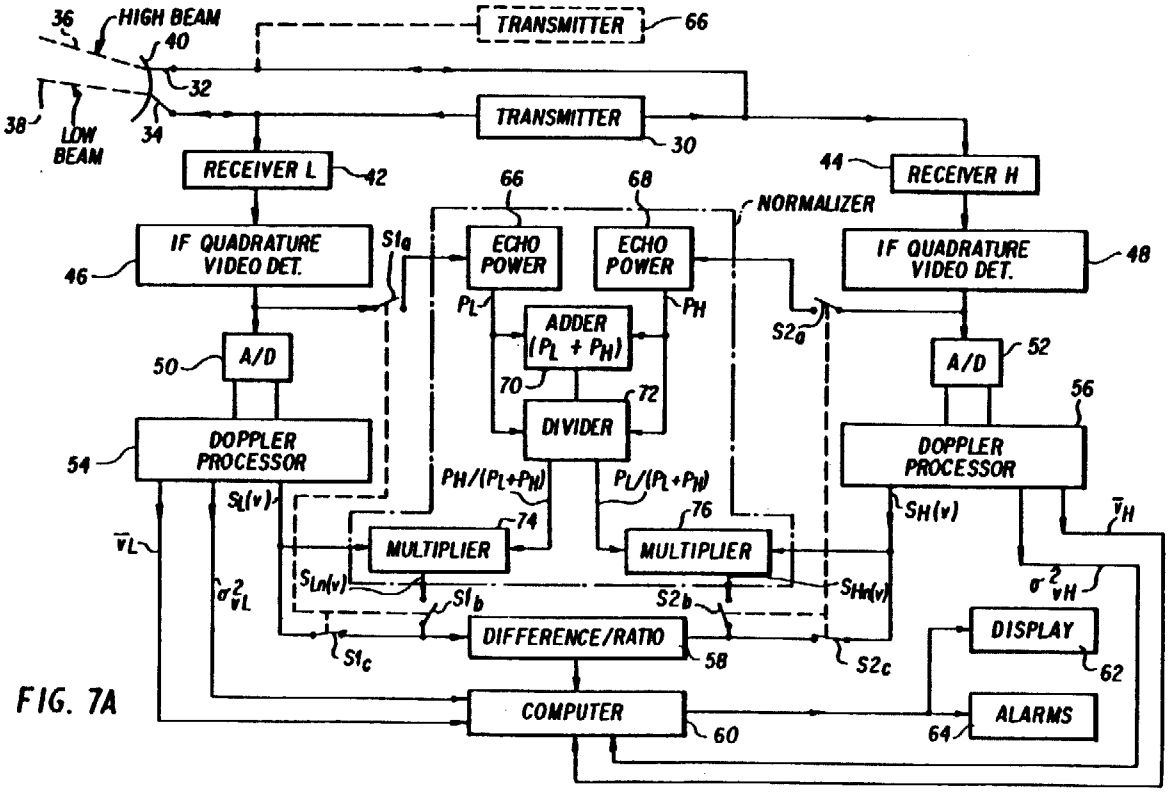
FIGS. 7A and 8A are system block diagrams broadly illustrative of two embodiments of the subject invention for a monostatic dual beam Doppler radar.

Block diagrams of four embodiments of apparatus for implementing the method described are shown in FIGS. 7A–8B. In FIG. 7A, there is disclosed a single transmitter 30 delivering radiant energy to two feeds 32 and 34 to form two beams 36 and 38 simultaneously on a single antenna 40. Both beams are broad but one beam 38 has a peak gain at a low elevation angle and the other beam 36 at a higher elevation. One key of this invention is that the low beam 38 has higher gain than the high beam 36 at low elevation angles and conversely at the higher elevation angles so that there is an angle of equal gain $G_H=G_L$ in the vicinity of 3° to 6° of elevation. Each beam returns its signals to respective receivers 42 and 44, and separate Doppler processing chains.

The two receivers 42 and 44 are identical, are linear and have wide dynamic range to encompass meteorological targets over a reflectivity range of at least 70 dBZ. The entire transmitter-receiver chain, moreover, is coherent so that one may detect the phase changes corresponding to moving targets at the output of the IF amplifier, not shown, in the receivers and produce in-phase (I) and quadrature (Q) components of the complex signals by IF quadrature video detectors 46 and 48 which are converted to digital signals by the analog to digital converters 50 and 52. The I and Q components corresponding to each and every range bin of the high and low beams 36 and 38 are sent to Doppler processors 54 and 56 for signal processing. Illustrative outputs are the first and second moments of the Doppler spectrum corresponding to the mean Doppler velocity $\bar{v}_L$ and $\bar{v}_H$ and the spectrum variance $\sigma^2 v_L$ and $\sigma^2 v_H$. The most important outputs of Doppler processors 54 and 56, however, are the entire Doppler spectra $S_L(v)$ and $S_H(v)$ of the two beams 36 and 38. A Doppler processor is well known to those skilled in the art and may take a variety of forms, a typical example being that of the ASR-9 radar. An important feature of the Doppler processor used, however, is that it must have a sufficient number of equivalent filters to permit the spectrum to be determined with adequate velocity resolution. This requires that the duration or dwell time of the sequence of complex signals be sufficiently large as discussed above. Further as shown in FIG. 7A, the Doppler spectra $S_L(v)$ and $S_H(v)$ from the two Doppler processors 54 and 56 are fed to a computational block 58 where the difference or ratio of the two Doppler spectra for each range bin is computed and the difference Doppler spectrum (DDS) or ratio Doppler spectrum (RDS) generated are thereafter fed into digital computer apparatus 60 for further processing. The data relating to the mean Doppler velocities $\bar{V}_L$ and $\bar{V}_H$ and spectrum variance $\sigma_{vL}^2$ and $\sigma_{vH}^2$ are also fed to the computer 60. The computer 60, among other things, operates to determine the measure of the radial gradient or derivative of the resulting spectrum output of the block 58 to provide, for example, a measure of wind shear. A suitable display 62 and alarm apparatus 64 are coupled to the computer 60 to provide an indication on a PPI display and running account of the location of a storm cell including microbursts, wind shear and the like, as well as the associated intensities. Since information is available concerning the mean Doppler velocities $\bar{V}_L$ and $\bar{V}_H$, the computer 60 also computes the difference therebetween to provide an approximate measure of the vertical shear between the reflectivity weighted boresight axes of the beams 36 and 38 as well as providing a confirmatory indication as to whether or not $v^*$ is greater or less than $v(0)$ and thus aids in determining whether the wind increases or decreases as a function of altitude.

In order to compensate for a vertical gradient in reflectivity, for example, the embodiment shown in FIG. 7A includes means for implementing a normalization of the beam spectra $S_L(v)$ and $S_H(v)$ mentioned above. Shown are means 66 and 68 for measuring the low and high beam echo powers which are coupled to video detectors 46 and 48, or alternatively to the outputs of the A/D converters 50 and 52, through switches $S1_a$ and $S2_a$. The power outputs $P_L$ and $P_H$ are fed to an adder 70 which generates an output of $P_L+P_H$. This output is fed to a divider computational block 72 along with $P_L$ and $P_H$ to provide power normalizing factors $F_L=P_L/(P_L+P_H)$ and $FH=P_H/(P_L+P_H)$. A first multiplier 74 couples to the $S_L(v)$ output of Doppler processor 54 along with the output $P_H/(P_L+P_H)$ to form a normalized output of $S_{Ln}(v)$ which is coupled to the computational block 58 by way of the switch $S1_b$ which is also ganged with switches $S1_a$ as well as $S1_c$. In one position of the ganged switches S1, $S_L(v)$ is fed to the difference/ratio block 58 while in the other position, $S_{Ln}(v)$ is coupled thereto.

In the same manner, a second multiplier 76 couples to the $S_H(v)$ output of Doppler processor 56 along with the $P_L/(P_L+P_H)$ output from the divider 72. The multiplier 76 generates a normalized spectrum output $S_{Hn}(v)$ which is coupled to the block 58 which switch $S2_b$ is closed. Switch $S2_b$ is ganged with switches $S2_a$ and $S2_c$ and operates together with switches $S1_a$, $S1_b$ and $S1_c$ so that the computational block 58 either receives unnormalized or normalized spectra depending on the position of the ganged switches which are set in accordance with the desired operational mode.

Since it is important for system operation that it be possible to distinguish the Doppler spectra observed with two radar beams, it should be pointed out that this can be enhanced when desirable by transmitting different microwave carrier frequencies while radiating the beams simultaneously as shown in FIG. 7A or, when desirable, different polarizations can be utilized for the high beam 36 and low beam 38. For an application where different carrier frequencies are to be utilized, it can be accomplished in a variety of ways, one of which may be the use of a second transmitter shown by reference numeral 66 and which is shown in FIG. 7A as a phantom element. Another method could include transmitting a pair of pulses in rapid sequence from the single transmitter 30 such that the two pulses are radiated at different frequencies. Also a single transmitter 30 may be utilized wherein the RF carrier frequency is switched after a sequence of pulses. In any event, it is understood that the frequency of the local oscillator with which the receive signals are mixed, must be switched synchronously with the frequency shifting of the transmitter. Where different polarizations are utilized, the feeds 32 and 34 are polarized differently. This technique is well known to those skilled in the art.

Figure 8A:
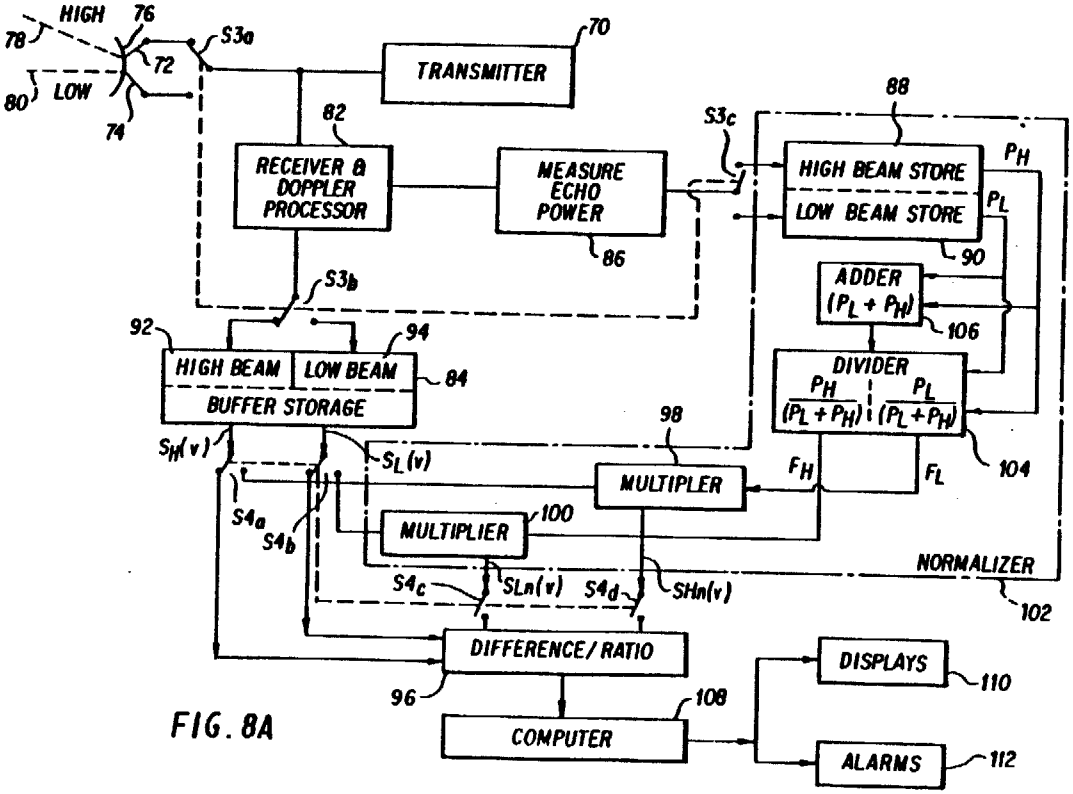

Where, however, the two radar beams are radiated sequentially, neither polarization or carrier frequency differentiation of the two beams is required. Accordingly, a second embodiment is shown in block diagrammatic form in FIG. 8A and is illustrative of apparatus whereby the transmitter and receiver are alternately switched from low beam to high beam as the antenna scans slowly and where fast scanning antennas are utilized the switching is done on alternate antenna rotations. Referring now to FIG. 8A, a three pole, two position switch is included wherein switch section $S3_a$ is coupled between a single transmitter 70 being alternately coupled to the feeds 72 and 74 of an antenna 76 where, for example, the feed 72 generates a high beam 78 while the feed 74 generates a low beam 80. A single receiver and Doppler processor shown by reference numeral 82 is shown coupled to a buffer storage 84 through the switch section $S3_b$ and to an echo power measuring circuit 86 which has its output alternately coupled to a high beam storage 88 and a low beam storage 90 through the switch section $S3_c$. Further as shown in FIG. 8A, the buffer storage 84 which includes a section 92, for the spectra of the high beam and a section 94 for the spectra of the low beam, have their respective outputs $S_H(v)$ and $S_L(v)$ coupled either to a difference or ratio computational block 96 or a pair of multipliers 98 and 100 in a normalizer section 102. The connection is made through two sections, $S4_a$ and $S4_b$ of a four pole, two position switch which also includes sections $S4_c$ and $S4_d$ which couple the outputs from the multipliers 98 and 100 to the difference/ratio computational block 96. It can be seen that in the first position of the switch S4, the high and low beam spectra outputs are coupled directly to the computational block 96, whereas in a second position of the switch, the spectra are coupled to the multipliers 98 and 100 which also receive as inputs the multiplication factors $F_H=P_H/(P_L+P_H)$ and $F_L=P_L/(P_L+P_H)$ from a divider 104 which receives the inputs $P_H$ and $P_L$ from the storage elements 88 and 90 and an adder 106 which performs an addition of the values of $P_H$ and $P_L$.

Thus where the beams 78 and 80 are operated sequentially, the outputs of the Doppler processor 82 are switched to the low and high beam sections 94 and 92 of the buffer memory 84 in synchronism with the RF switch between the transmitter and the high and low beams. The power measurement apparatus 86 alternately measures the low and high beam echo powers depending upon which beam is operating. These echo powers are alternately stored in the memory sections 88 and 90 from which the adder and divider blocks 106 and 104 provide the power normalizing factors $F_H$ and $F_L$ in a manner previously described with respect to the embodiment shown in FIG. 7A. The difference/ratio computational block 96 provides either a difference Doppler spectra (DDS) or ratio Doppler spectra (RDS) for each range bin which are further operated upon by a computer unit 108 which includes sufficient storage and processing capabilities to identify the v* Doppler velocities at low levels near the surface, display them in a sequential range format to depict the radial shear and also to display the breadth of the Doppler spectra as determined either by the Doppler processor or the DDS, i.e. $v(0)-v^*$. Accordingly, suitable display apparatus 110 and alarm devices 112 are coupled to the computer 108 in the same manner as that shown in FIG. 7A.

Figures 7B, 8B:
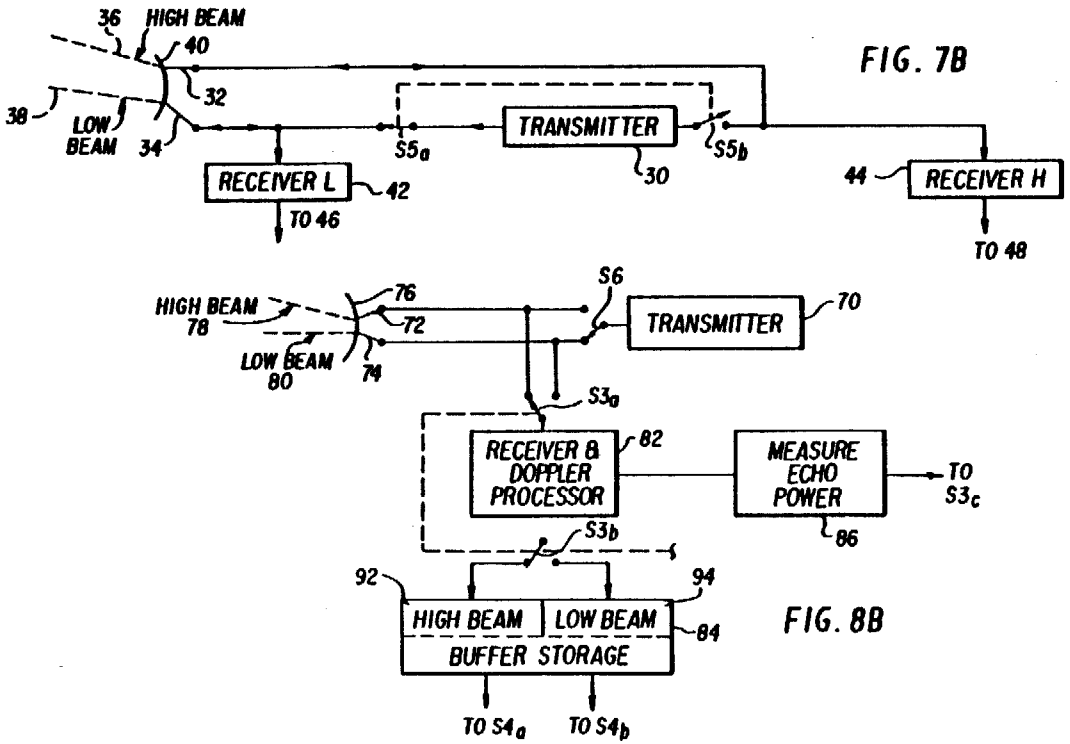
FIGS. 7B and 8B are partial system block diagrams broadly illustrative of two embodiments of the subject invention for a bistatic dual beam Doppler radar in which one beam is monostatic and the other is bistatic.

Block diagrams of two alternative embodiments of apparatus for implementing the method are shown in FIGS. 7B and 8B. In FIG. 7B, transmitter 30 radiates its energy through only the low beam 38 when switch S5a is closed. However, there is sufficient energy radiated by the low beam toward scatters at high elevation angles that echoes from targets in the high beam may be received simultaneously on both high and low beams. In this case the high beam is operating in the bistatic mode such that its effective gain function is as previously described.

In contrast, when switch $S5_b$ is closed and $S5_a$ is open, the high beam 36 acts as a transmitting and receiving beam in a monostatic mode and the low beam 38 receives in a bistatic mode. In the latter mode, the gain of the high beam will be enhanced with respect to the effective gain of the low beam. This will increase the magnitude of the negative differential gain above the null and decrease that of the positive differential gain below the null. Accordingly, switching the transmitter 30 from low to high beam will act predominantly to reduce the magnitude of the positive portion of the DDS and increase that the negative portion. This modulation of the DDS with switching can be used to enhance the confidence with which one may identify the particular bounds of the DDS in which one is interested. However, if the radar is to be used simultaneously for aircraft surveillance, the preferred mode is to transmit through the low beam. In either case, those echoes returned via the low beam 38 and high beam 36 are channeled to their associated receivers 42 and 44, respectively, and the remainder of the embodiment operates as shown in FIG. 7A.

Corresponding to the sequential switching and signal storing embodiment in FIG. 8A is the alternative approach shown in FIG. 8B. There, energy from transmitter 70 is channeled either to the high beam 78 or low beam 80 through switch S6 in a manner corresponding to the embodiment of FIG. 7B. The echoes received via these beams are then switched alternately to the receiver and Doppler processor 82 via switch $S3_a$. Switch $S3_b$ which is ganged to $S3_a$ then channels the corresponding spectral information to the high beam and low beam buffer stores 92 and 94, respectively. The outputs of the buffer store 84 are then processed further as was illustrated in FIG. 8A.

Figure 9:
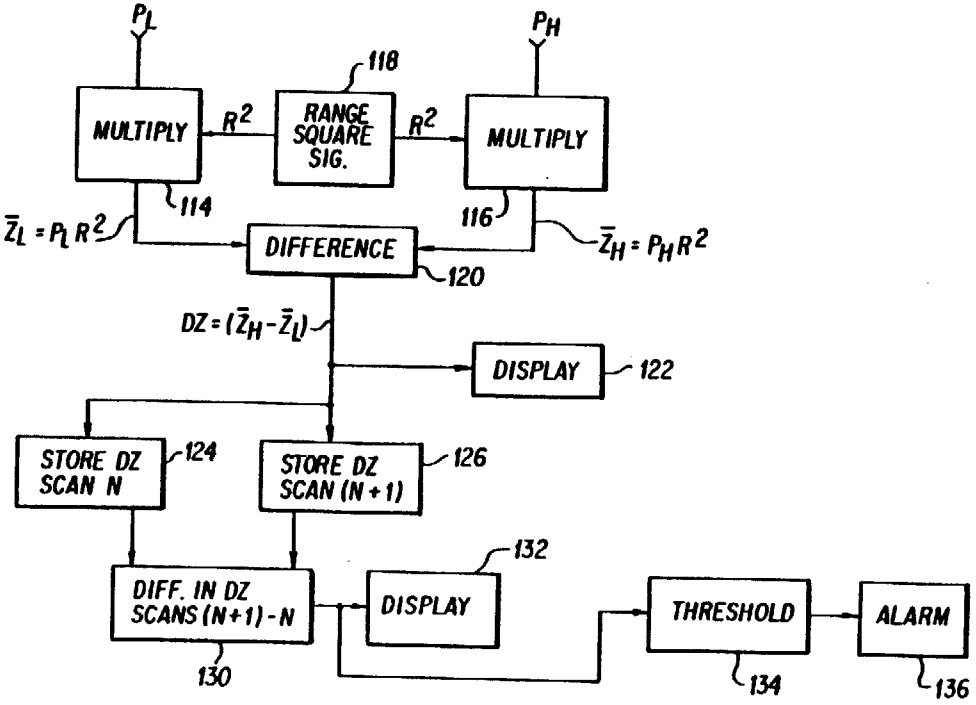
FIG. 9 is a block diagram of apparatus utilized in connection with the embodiments shown in FIGS. 7A–8B for determining the difference in reflectivity.

Referring now to FIG. 9, there is shown a means which can be utilized with either of the two embodiments shown in FIGS. 7 and 8 for measuring the differences in average reflectivity in the two beams and monitoring the rate of change thereof as an implementation for detecting a possible precursor of a downburst. As depicted, a pair of multipliers 114 and 116, respectively, are coupled to the echo power $P_H$ and $P_L$ along with a range square signal $R^2$ from a squarer computational block 118. The output of the two multipliers 114 and 116 respectively comprises the average reflectivities $\bar{Z}_L=CP_LR^2$ and $\bar{Z}_H=CP_HR^2$, where C is a radar constant and R is range, which are fed to apparatus 120 for determining the difference DZ therebetween. The difference in the average reflectivities is furthermore shown coupled to display apparatus 122 as well as a pair of storage units 124 and 126 which are operable to store the magnitude of DZ in successive scans N and N+1. The difference in reflectivities stored are then fed into means for determining the time difference as shown by reference numeral 130 whereupon the time difference is fed to additional display apparatus 132 as well as a threshold circuit 134 which is coupled to an alarm circuit 136.

Figure 10:
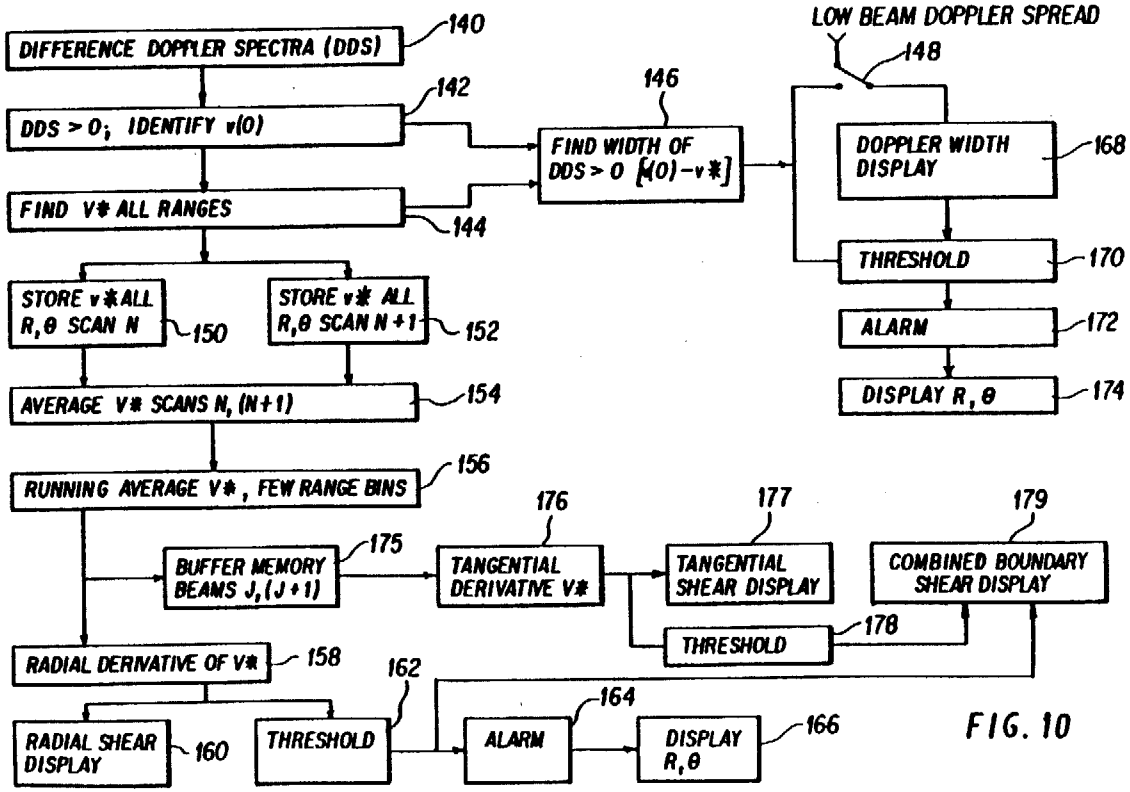
FIG. 10 is a flow chart illustrative of the operation of the radar computer shown in FIGS. 7A–8B for operating on difference Doppler spectrum data for producing an indication of microbursts and wind shear.

Attention is now directed to FIG. 10, where there is shown the sequence of steps in the method for computing the difference Doppler spectrum (DDS). It should be noted, however, that the same method is utilized for computing the ratio Doppler spectrum (RDS) and thus can be substituted for DDS throughout the description to follow. Step 140 simply shows the DDS exists for each range bin. In step 142 the portion of the DDS which is positive and greater than zero is determined. This identifies v(0), the velocity at the null. This assumes that the high beam is subtracted from the low beam. The converse procedure will also work except that the step 142 condition requires that one then finds the portion of the DDS which is negative. Next in step 144 the other bound v* of the positive portion of the DDS is determined. This is associated with the wind speed near the surface. At the same time as step 114 the width of the DDS corresponding to elevations below the two beam null is determined as shown by reference numeral 146. As noted earlier, the quantity $v(0)-v^*$ is an approximate measure of the vertical shear of the horizontal wind between the surface and the height of the null. The switch 148 at the output of step 146 indicates that the low beam Doppler spread may also be used as an alternative measure of this shear. Next steps 150 and 152 indicate that the values v* (positive or negative) at all range binds for each beam on the N and (N+1) scans are stored. Assuming that the scans are not displaced more than a few seconds so that the observed phenomenon does not change excessively between scans, the v* values on scans N and N+1 for the same ranges and azimuths are averaged per step 154 to provide a smoother range profile of v* than is likely to be available on a single scan. Following this, step 156 provides additional smoothing by taking a running average of v* over a few range bins under the condition that the range resolution after averaging remains better than about 300 m. It should be noted that narrower transmitted pulses may be used to provide more independent measurements of v* and reasonable range smoothing while retaining high range resolution. Either steps 154 or 156 may be omitted if the signal dwell time is sufficient and there are a sufficient number of equivalent Doppler filters in the Doppler processor to provide high quality Doppler spectra. The radial derivative of v* or the shear is next provided per step 158 followed by a display of the radial shear as shown by reference numeral 160 on a contour mapped or coded display such as a plan position indicator (PPI) or equivalent display thereby allowing an observer to determine quickly where the radial shear is excessive. Step 162 submits the radial shear to a preset threshold and triggers an alarm when the threshold shear is exceeded as shown by 164. Simultaneously, it cause the position of the large shear to be displayed digitally in R, $\theta$ or equivalent coordinates in step 166. To allow for the occurrence of a number of microbursts simultaneously, the alarm display must have the capacity to display a multiplicity of such positions. The alarm positions are communicated automatically for example, to all pertinent airport surveillance displays and to the air traffic controllers in the tower. When desirable, the display apparatus may be replaced by or include machine controlled algorithms; e.g. artificial intelligence systems.

The Doppler width signal is also presented on a PPI or equivalent display per step 168 and is indicative of either the vertical shear of the horizontal wind in the low levels, or tornado vortices or turbulence intensity when the latter are present. Because all these phenomena affect both $v(0)-v^*$ and the low beam Doppler spread, the Doppler width display is ambiguous and requires additional signatures or human interpretation. Nevertheless since tornado vortices and intense turbulence are also hazards, when the Doppler spread exceeds a predetermined threshold (step 170) an alarm (step 172) is also triggered. The positions of these alarms are also indicated in R, $\theta$ or equivalent coordinates on all relevant displays per step 174.

It will become clear at a later date whether either the radial shear alarm or the Doppler width signature alarm is sufficient in and of itself. If the simultaneous occurrence of both enhances the probability of detection and minimizes false alarms, then it is evident that one may include an additional step (not shown) which requires coincidence of the two alarms within a prescribed R, $\theta$ window.

Although it has not been mentioned up to this point, the availability of the near surface winds at all ranges and azimuths also permits the detection of the azimuthal or tangential shear of the radial wind. This is also indicative of microbursts, of mesocyclones, and of tornado vortices. Since these are also hazards both to flight safety and the general public, the flow chart of FIG. 10 further includes step 175 which calls for a buffer memory to store the v* values on adjacent beams, J and J+1, and if desired, on still other additional beams. Following step 175, the tangential derivative of v* is determined by step 176 and displayed on a PPI or equivalent display as shown by step 177. Appropriate signature recognition algorithms may also be utilized to identify the nature and intensity of the phenomenon responsible for the observed shear.

In the case of a microburst, the measured radial shear will be maximized along the direction of the radar beam which coincides with the axis of maximum divergence as shown by the long axis of the elliptically shaped outline in FIG. 1B. Along this direction and immediately adjacent thereto, there will be small tangential shear. In contrast, on the left side of the microburst boundary shown in FIG. 1B, the wind component will shift from $V_L$ which is normal to the major axis, to the environmental wind outside the microburst. This will also occur on the right side. Accordingly, these lateral boundaries will display minimal radial shear and large tangential shear to a radar which is located some distance away along the direction of the major axis of the ellipse. Accordingly, the display which is highly likely to depict the nearly complete boundary of the microburst gust front is that which plots the sum of the signals corresponding to the radial shear which exceeds a threshold and the tangential shear which exceeds a threshold. Both thresholds should be adjustable until experience demonstrates the levels at which one obtains the most complete and coherent boundary which is discernable from noise.

It should be noted that the combination of the two shear exceedence thresholds will also provide one of the most reliable displays of any frontal zone regardless of the relative orientation of the frontal boundary to the radar.

Based upon the above description, the output of the tangential shear is therefore passed to a threshold step 178. The output of step 162 corresponding to the regions in which the radial shear exceeds the threshold 162 is then combined with step 178 after having determined the corresponding boundaries to provide the combined shear boundary display 179.

The combined shear boundary display may be either a storage display in which the sequence of successive positions of the microburst boundary as seen at successive intervals may be depicted, or it may be a storage and playback device in which the successive positions of the expanding boundary or other frontal zones may be played back in accelerated time lapse mode or animation.

It is emphasized that the process of displaying a pattern such as the ellipse-like boundary of the microburst produces a significant enhancement of the effective signal to clutter ratio which was a problem of concern earlier with regard to the detection of the weakly reflective dry microbursts. Pattern recognition permits the analyst to detect the phenomenon even though the region being mapped may contain a distribution of strong clutter echoes. This is particularly relevant in the case of the areas immediately surrounding airport runways which must be clear of obstacles and are therefore free of major ground clutter.

Furthermore the process of either displaying the sequence of evolving microburst boundaries or the rapid time lapse playback of their successive positions enhances the effective signal to noise and signal to clutter ratio even more dramatically. Thus the methods just described should be exceedingly powerful in detecting even weakly reflecting hazardous small scale phenomena with confidence, in minimizing false alarms, and in projecting the paths of the disturbances. It should be noted that pattern recognition may involve either human cognitive capabilities or artificial intelligence systems.

Figure 11:
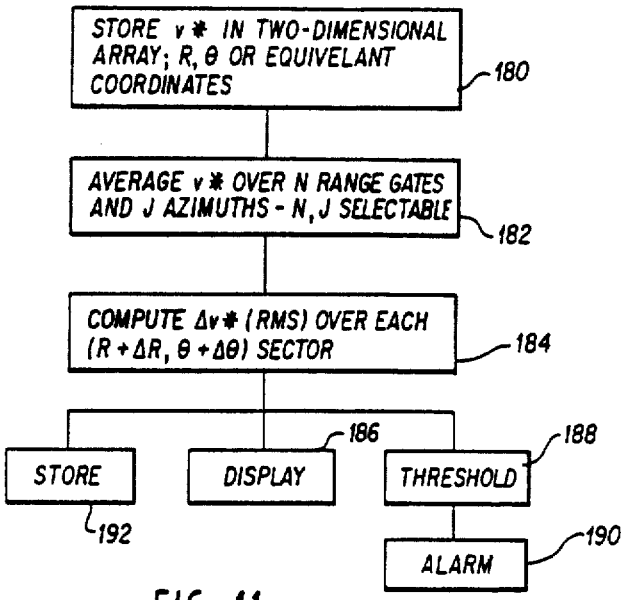
FIG. 11 is a flow chart illustrative of a method for computing and displaying turbulence with the radar computer shown in FIGS. 7A–7B.

FIG. 11 also indicates additional steps by which turbulence of the near surface wind speed v* can be identified. Step 180 calls for storing all the values of v* over an entire scan. In step 182, v* in all $R+\Delta R$, $\theta+\Delta\theta$ windows are averaged where the size of the window is determined by the number of range bins N and number J of azimuths averaged. Next the RMS variation of v* over the selected sub-sectors as a measure of the turbulence intensity is computed as indicated by step 184.

This is followed by step 186 which turbulence intensities in PPI form or the equivalent are displayed. Steps 188 and 190 comprises the steps associated with selecting and triggering the desired turbulence intensity threshold and alarm.

As a microburst, mesocyclone, or tornado develops and builds downward, the variations with time of the radial shear, the tangential shear, and spectral breadth, and the turbulence will all change rapidly at the location of the phenomenon in question. Similarly, the vertical shear of the low level wind as determined from the bounds of the positive portion of the DDS will also vary rapidly. Thus, the early warning of incipient hazards will depend upon algorithms, displays and alarms which indicate rapid changes in the above listed parameters during a sequence of scans partly as already described above. Although not shown, another set of steps in the method by which such changes may be detected with time are to store the full plan map of each parameter on scan M and to compare it to the values of the same parameter on scan M+1. A new plan map is then plotted and displayed indicating only those positions at which the parameter has changed by an amount exceeding a prescribed increment, either positive or negative. Since there will be both natural and statistical fluctuations in this process, the process may be repeated on scans M+2, M+3, etc., thereby mapping only those places at which the change is persistent and in excess of a prescribed value.

The parameters which should be examined in this way are $v^*$, the radial and tangential gradients of $v^*$, the vertical shear $v(0)-v^*$, or low level Doppler spread, the turbulence intensities, and the difference in the echo powers in the two beams. It should be noted that in the case of a descending and evolving microburst, an expanding ellipse corresponding to the diverging front of the microburst should be discernible and should appear in most of the above listed parameters as described earlier for the combined shear display. An increased measure of confidence in sounding an alarm may be provided by requiring the time changes of two or more of the parameters to occur essentially simultaneously and in the immediate proximity of one another.

In the case of downbursts, the axis of the downburst generally has been found to be coincident with a reflectivity maximum. In the case of wet downbursts, i.e. those accompanied by rain, its onset will tend to be marked by reflectivity increasing with height and by a rapid descent of the high reflectivity zone aloft. Thus, any rapidly descending region of high reflectivity is a potential indicator of the downburst. Accordingly, the echo power may be used as a proxy for the beam weighted reflectivity; alternatively the echo power may be normalized according to the square of the range, i.e. $PR^2$ which is proportional to the beam weighted or equivalent reflectivity $Z_e$. One may form the difference between $Z_e$ in the high and low beams and store the vertical difference parameter $(Z_{eL}-Z_{eH})$ on scan M and compare it with the successive echoes on scans (M+1), (M+2), etc. as described in the previous section for all the other parameters. Then only the time changes in this parameter are displayed as previously described. The rapid change of this parameter should provide an early indication of an incipient downburst, especially when accompanied by one or more of the signatures previously described. Of course, either a flashing marker or an audible alarm may be used to indicate time changes exceeding a preset threshold.

As noted earlier, another approach toward the measurement of low level wind speed with a dual wide beam Doppler radar is to utilize differential polarization to discriminate the echoes on the lower beam from those on the upper beam. For example, if horizontal polarization is used on the low beam and vertical polarization on the high beam, it is possible to obtain approximately 15 to 20 dB of isolation between the two beams depending upon the polarization purity of the antenna and the shape and orientation of the scatterers. In any case, the Doppler spectra on each of the beams can be obtained by detecting only those signals which are appropriately polarized. The difference between the Doppler spectra will then be similar to that expressed by Eq. (6), with the exception that the reflectivity factor may be polarization dependent. Eq. (6) therefore becomes $$S_L(v)-S_H(v)=[G_LZ_L(v)-G_HZ_H(v)]|dh/dv| \quad (14)$$

where it is understood that the low and high beams are polarized differently and the subscripts L and H on Z indicate the corresponding beams and polarizations. Of course, it is not necessary that the polarizations be linear vertical and horizontal. They may be chosen to be of any suitable form which provides discrimination and separation of the high and low beam signals upon reception.

The crucial advantage of differential polarization on the two beams is that it provides an additional means to distinguish the echoes on the low beam from those on the high beam. Because rain has a slightly larger reflectivity for horizontal polarization than for vertical polarization, it is desirable to use horizontal polarization on the low beam and vertical polarization on the high beam.

In stratiform storms, the melting layer also generally shows higher reflectivity for horizontal polarization. However, in general, one does not expect to find a well defined melting layer in convective storms which produce most of the hazardous phenomena with which we are concerned. Thus, it is likely that the use of horizontal polarization on the low beam will enhance the effective DG between the two beams. At all heights below the null, the ratio of $S_L(v)$ to $S_H(v)$ should exceed unity (DDS>0) simply because the upper beam is insensitive to horizontal polarization and conversely. Moreover, at the null level where $G_L=G_H$, the spectral density in the two differentially polarized beams should be roughly equal unless a layer of oriented particles as in the melting layer is present. In that case, one would expect the echoes from that layer to enhance the horizontally polarized lower beam if that beam encompasses the melting zone at the ranges of interest. Therefore, the use of differential polarization in conjunction with differential gain enhances the methods of detection previously described. In the event that the beam discrimination of precipitation and other meteorological targets is accomplished by differential polarization, it would not be possible to use circular polarization simultaneously on both beams unless one is left hand circular and the other is right hand circular. It is also possible to discriminate between the low and high beams by use of polarization modulation in a distinctive code on a series of pulses.

It should be apparent that differential polarization should not be used when either the high or low beam is used in a bistatic mode as in FIGS. 7B and 8B. If this were done, then the receiving beam would be virtually insensitive to the polarization of the transmitting beam.

Figure 12:
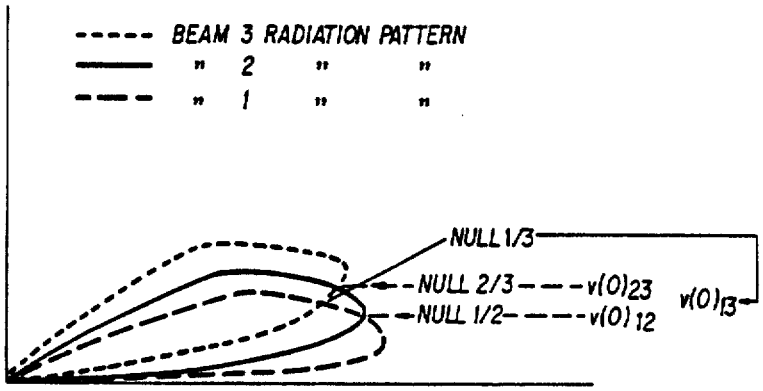
FIG. 12 is illustrative of another aspect of this invention where more than two overlapping beams of a radar are utilized.

The method of identifying the range of wind velocity components above and below the null of a two beam Doppler system may furthermore be extended to three or more beams of the use of two beams which are sequentially stepped in elevation angle to provide more explicit information concerning the vertical profile of winds. The essence of this approach is illustrated in FIG. 12. In FIG. 12, three beams 1, 2 and 3 are depicted. Alternatively beams 2 and 3 may be regarded simply as beams 1 and 2 which have been elevated. Whether just two beams are employed and elevated in sequence or three or more beams are used simultaneously depends mainly upon the speed with which one wishes to accomplish the measurements; otherwise the principles are the same.

It is to be noted that three nulls exist at which the gains of the various pairs of beams are equal. Using the two beam method previously described, three null velocities $v_{12}(0)$, $v_{23}(0)$, and $v_{13}(0)$ can be determined where the subscripts indicate the corresponding number of the beams involved. Using beams 1 and 2, $v^*$ from the bounds of the corresponding DDS can also be determined where as noted earlier, $v^*$ is the near surface wind component. Similarly, by using the negative portions of the DDS between beams 2 and 3, the velocity range at heights above the null § can be determined. In addition, the non-null bound of that negative portion, designated as $v^{**}$ which is the wind velocity at a height near the upper reaches of beam 3 can also be determined. In this way, an approximate profile of the radial wind components can be generated. It is obvious that the method may be extended to more beams or to more heights by using just two beams in the sequential stepping mode.

Because of the many advantages of the rapid update cycle of a fast scanning antenna system, including enhanced detection confidence through pattern recognition and time lapse playback, and the further benefits of obtaining 3-dimensional information such as the vertical shear and reflectivity profile, it becomes clear that one may enhance the overall system performance even more by the use of a vertical stack of narrow pencil beams. A set of several beams (e.g. 3 to 6), each with its own receiver could cover the lowermost 5° or 6° of elevation angle. The transmitting beam could be a single vertical fan beam which just envelopes the stack of receiving beams. Alternatively, the power may be distributed among the plurality of narrow beams, or each may use its own transmitter. In any case, the use of a set of narrow beams would allow the determination of the mean Doppler velocity, the Doppler spectral breadth, and the reflectivity at all elevations and ranges simultaneously. Then the mean Doppler velocity on the lowermost beam can be utilized in every instance in lieu of the near surface velocity $v^*$ obtained by the previously described methods. At the same time, the vertical shear would be determined from the profile of mean Doppler velocities on all the beams and similarly for the reflectivity profile. One may operate on these parameters in the manner previously described.

Some of the major advantages of the latter approach are: (1) to achieve more accurate measurement of the surface air velocity and all the shear components with the narrow beams and the longer dwell time which is available because a single narrow beam is not required to scan a 3-dimensional volume; (2) to be able to reduce antenna side lobes and enhance clutter rejection; (3) to permit use of the time changes of the more accurate vertical shear and reflectivity gradients as precursors of hazardous events; (4) to enhance effective signal to clutter ratios through pattern recognition and a time lapse playback; and (5) to increase overall sensitivity. Except for the increased costs involved in replicating a plurality of beams, receivers, and data processing systems, the multiple stacked narrow beam approach would be a desirable mode if one were not required to use an existing radar or otherwise constrained.

Accordingly, what has been shown and described is a method aimed primarily at the detection and mapping of the position and estimating the intensity of microbursts and the associated low level wind shear which are particularly hazardous to aircraft in takeoff and landing as well as detecting the position and intensity of other weather phenomena such as gust fronts, mesocyclones and tornado vortices which are associated with significant changes in which velocity with range and/or azimuth.

Although this invention has been disclosed with a certain degree of particularity, it should be noted that the same has been made by way of illustration and not limitation. Accordingly, all modifications, alterations, and changes coming within the spirit and scope of the invention as defined in the following claims are herein meant to be included.

What is claimed is:

1. A method for detecting hazardous relatively small scale weather disturbances in an area of surveillance, comprising the steps of:

radiating at least one Doppler radar beam toward a region of scatterers and scanning said beam in azimuth;

receiving echo signals in at least first and second vertically overlapping beams from said scatterers in said first and second beams from a sequence of range bins, wherein the effective differential two way beam gain of said first and second beams is of a first polarity at all angles below a predetermined null level and of a second polarity at all angles above said null level, wherein said null level corresponds to the elevation angle at which the effective two way gain of said first beam equals that of said second beam, and wherein said first and second polarities may be mathematically operated upon selectively to provide first and second parameters equivalent to said first and second polarities;

determining the respective Doppler velocity spectra from said first and second beams from said sequence of range bins;

generating a composite Doppler spectrum which is a mathematical function of the Doppler spectra of said first and second beams, said composite spectrum defining the Doppler velocity domains wherein the two Doppler spectra differ in said first and second polarity senses;

determining two velocity bounds in the region of said composite Doppler spectrum wherein said composite spectrum is of said first polarity;

generating signals identifying the first of said two velocity bounds as a measure of wind speed at said null level;

generating signals identifying the second of said two velocity bounds as a measure of wind speed at a level between the height of the null level and the surface of the earth, said wind speed being defined as the radial component of the near surface wind speed;

measuring the near surface wind speeds in said sequence of range bins;

selectively determining the range derivative of the near surface wind speeds, the tangential derivative of the near surface wind speeds, the difference between the first and second velocity bounds, the difference between the mean reflectivities in said first and second beams, and generating output signals corresponding thereto; and providing at least one indication of said output signals to thereby provide an indication of a weather disturbance in said area of surveillance, particularly the shear of the near surface winds including horizontal, vertical and tangential shear and the boundaries at which said shears exceed preset thresholds.

2. The method as claimed in claim 1 wherein said composite Doppler spectrum comprises the difference Doppler spectrum of the two Doppler spectra.

3. The method as claimed in claim 1 wherein said composite Doppler spectrum comprises the ratio Doppler spectrum of the two Doppler spectra and where the first and second polarity senses correspond to said first and second parameters greater than unity and less than unity, respectively.

4. The method as claimed in claim 1 and prior to the step of generating said composite Doppler spectrum additionally including the steps of:

normalizing the first beam Doppler spectra by multiplying the first beam Doppler spectra by the fractional power of the sum of the echo powers in said first and second beams which is received on said second beam;

normalizing the second beam Doppler spectra by multiplying said second beam Doppler spectra by the fractional power received on said first beam;

and wherein said composite Doppler spectrum is a mathematical function of the normalized Doppler spectra of said first and second beams.

5. The method as claimed in claim 1 wherein the echo signals from said first and second beams are received simultaneously.

6. The method as claimed in claim 1 wherein the echo signals from said first and second beams are received sequentially.

7. The method as claimed in claim 6 wherein said step of generating said composite Doppler spectrum further includes the steps of selectively storing the Doppler spectra or signals from which they are derived of one of said first and second beams until the Doppler spectra or signals from which they are derived of the other of said beams is determined and thereafter after determining the difference between the first and second Doppler spectra as if said first and second beams had been received simultaneously.

8. The method as claimed in claim 1 wherein said step of radiating includes radiating a second beam, wherein said first and second radiated beams comprise a low beam and a high beam having mutually different polarizations, and additionally including the steps of generating an additional parameter of said two velocity bounds of the first polarity region of said composite Doppler spectrum as a function of the difference in polarization, the velocity bound corresponding to said null level in said composite spectrum being identified with nearly equal power spectral density in the spectra corresponding to both beam polarizations, and the velocity region corresponding to the near surface wind speeds having power spectral density which is polarized predominantly with the polarization of said low beam, said difference in polarization thereby providing an additional independent indication that the second bound of said composite Doppler spectrum is associated with near surface wind speed.

9. The method as claimed in claim 1, wherein said radiating step includes radiating a second beam at a different carrier frequency from that of said at least one beam, the difference in carrier frequencies of said radiated beams being sufficient to preclude reception of echo signals of said at least one beam by the second received beam, and vice versa, thereby assuring that the Doppler spectra from said first and second received beams are substantially separated, thereby permitting the second bound of said first polarity portion of composite Doppler spectrum to be more readily identified with the near surface winds.

10. The method as claimed in claim 1 and including the further steps of determining the boundaries of the region in which the radial shear exceeds an adjustable preset threshold and in which the tangential shear exceeds an adjustable preset threshold and combining the signals corresponding to said boundaries on a combined indicator to depict the essentially complete extent of said weather disturbance in said area of surveillance.

11. The method as claimed in claim 10 and including the further steps of storing a sequence of boundary signals of said disturbance at successive intervals and playing back said stored boundary signals in a time lapse mode, thereby providing a greatly enhanced effective signal to noise and signal to clutter ratio even for weakly reflective hazardous disturbances and further enhancing the probability of detection and minimizing false alarm through pattern recognition and motion detection as well as providing indications of the location, motion, and projected positions of such hazardous disturbances.

12. The method as claimed in claim 1 and including the further steps of determining a selected combination of any set of said output signals, storing said output signals as observed at a sequence of time intervals, and displaying said sequence of stored signals in accelerated time lapse mode thereby providing increased reliability of detection of hazardous weather disturbances, indications of its past and projected track and evolution, and the earliest possible precursors of incipient disturbances.

13. The method as claimed in claim 1 and additionally including the further steps of averaging the near surface wind speeds over preselected area segments of said area of surveillance and determining the variances of said wind speeds about the segment averages as a measure and indication of low level turbulence.

14. A method as claimed in claim 1 wherein the first and second received beams respectively comprise a low beam and a high beam, and additionally including the step of determining the breadth of the low beam Doppler spectrum at all ranges and azimuths, generating a pattern of said breadth, and utilizing said pattern as a further indication of a weather disturbance.

15. The method as claimed in claim 1 and additionally including the steps of determining the average reflectivities in each of said first and second received beams, determining the difference of said reflectivities, and determining and indicating the rate of change of said vertical differences in a vertical direction at a sequence of times as an indication of the progressive alternation of the vertical profile of reflectivity thereby providing a precursor of an incipient hazardous small scale weather event such as a microburst as well as providing a method of tracking the location and evolution of such events and projecting their positions.

16. The method as claimed in claim 1 and additionally including the step of generating a two dimensional indication of the vertical wind shear and its evolution with time to provide an indication of a microburst and other weather hazards.

17. The method as claimed in claim 1 wherein said first beam comprises the lower beam and said second beam comprises the higher beam of said vertically overlapping beams and wherein said first polarity comprises a positive polarity and said second polarity comprises a negative polarity.

18. The method as claimed in claim 1 and additionally including the steps of:

storing hazard indicating parameters for a plurality of successive scans;

determining the difference between respective parameters for a sequence of successive pairs of scans; and indicating said difference when its magnitude exceeds a prescribed increment, thereby providing an early warning of incipient hazardous phenomena as well as enhanced effective signal to noise and signal to clutter ratios to establish a clear pattern of the track of said phenomena and the associated evolving patterns of diverging low level winds, gust fronts, turbulence, shear and the like.

19. The method as claimed in claim 1 wherein said step of receiving comprises a receiving at least a third vertically overlapping beam and providing thereby three null levels therebetween, said first beam being the lowermost beam, said second beam being the intermediate beam, and said third beam being the uppermost beam, wherein said null levels of the differential gain therebetween provide radial components of the winds at the respective heights of said null levels, wherein said second velocity bound of a first polarity portion of a composite Doppler spectrum between said first and second beams provides a measure of the near surface wind speed, and wherein said second velocity bound of a second polarity portion of a composite Doppler spectrum between said second and third beams provides a measure of, the radial component of the winds in a region above the uppermost null level, thereby providing an approximate vertical profile of the winds within a predetermined air space.

20. The method as claimed in claim 1 and additionally including the step of sequentially varying the elevation of said first and second beams for varying the height of said null and generating thereby a vertical profile of the winds within a predetermined air space.

21. A radar method of detecting hazardous weather phenomena associated with rapidly descending events such as a downburst and which comprises the steps of:

radiating at least one beam sufficiently large in vertical breadth to illuminate the aras encompassed by a plurality of vertically displaced receiving beams from an antenna scanned in azimuth toward a region of scatterers;

receiving the echo powers from said plurality of beams, said echo powers being representative of the average reflectivity of the scatterers in said beams;

determining the measure of the relationship between the echo powers between said beams at successive elevations at all range bins of a radar system, said relationship providing information representative of the vertical profile of average reflectivity of weather phenomena detected by said radar system;

storing a sequence of said measures for successive scans of said antenna;

determining the time difference of said measures; and generating a time history of said measures, thereby providing an early indication of rapidly changing reflectivities and profiles associated with a descending downburst and providing a changing pattern corresponding to an evolving downburst and other weather hazards.

22. A Doppler radar method of detecting hazardous weather phenomena comprising the steps of:

radiating at least one beam having a predetermined vertical breadth covering an area encompassed by a plurality of vertically stacked receiving beams from an antenna scanned in azimuth toward a region of scatterers;

receiving the echo power and corresponding reflectivities on a plurality of vertically stacked receiving beams in a predetermined number of range gates;

measuring the components of the near surface winds along the direction of the beam from the mean Doopler velocity on one or more of the lower beams of said plurality of beams at a sequence of relatively closely spaced azimuths;

determining the range derivative and the tangential derivative of said surface wind components from the mean Doppler velocities at successive ranges and at said closely spaced azimuths as a measure of the radial and tangential shear, respectively, associated with hazardous small scale phenomena such as downbursts or microbursts and tornadoes;

determining the locations at which the measure of the radial and tangential shear exceed adjustable preset thresholds; and generating alarms when either of said shears exceed said thresholds.

23. The method as claimed in claim 22 and further including the steps of generating boundary locations at which said shears exceed said thresholds, combining the signals corresponding to said boundary locations and reproducing said signals on a combined monitoring device to provide an essentially complete boundary and increased probability of detection of a hazardous disturbance such as a microburst.

24. The method as claimed in claim 23 and further including the steps of storing said combined signals for a sequence of times and reproducing said stored signals in a predetermined playback mode to provide further enhanced detectability through motion of a coherent pattern across a clutter environment, and mapping and tracking the motion and evolution of said hazardous disturbance and projecting its future positions.

25. The method as claimed in claim 24 and repeating the above steps on each of the higher beams to provide a potentially earlier signature of a descending hazardous disturbance.

26. The method as claimed in claim 22 and further including the steps of measuring the vertical shear of the horizontal wind components in corresponding range gates of the stack of vertical beams, generating a signal corresponding to said vertical shear, differencing said vertical shear signals at successive time intervals and triggering an alarm and reproducing the locations at which the difference between said signals exceeds a preset threshold to provide a potential precursor of hazardous events.

27. The method as claimed in claim 26 and further including the steps of storing said vertical shear signals for a sequence of time intervals and reproducing said sequence of signals in a predetermined playback mode to provide precursor signatures of hazardous events, enhanced detectability, tracking the location and evolution of said events, and projecting their future positions.

28. The method as claimed in claim 22 and additionally including the steps of averaging the near surface wind speeds over preselected area segments of said area of surveillance and determining the variances of said wind speeds about the segment averages as a measure and indication of low level turbulence.

29. The method as claimed in claim 22 and additionally including the step of determining the measure of the relationship between the echo powers between said plurality of beams at successive elevation angles and at a plurality of range bins and azimuths of a radar system, said relationship providing information representative of the vertical profile of average reflectivity of weather phenomena detected by a multiple beam Doppler radar system, storing said measures for a sequence of times, and reproducing said time sequence as an indication of evolving weather hazards.

30. The method as claimed in claim 22 and further including the steps of reproducing said Doppler spectral width at a plurality of elevation angles, range bins and azimuths and triggering an alarm when said width exceeds a preset threshold.

31. The method as claimed in claim 22 and further including the steps of reproducing the boundaries of the disturbance as determined on at least two elevation angles simultaneously from at least one parameter on a single indicator, coding each of said boundaries in a respectively distinct manner corresponding to said elevation and thereby providing a quasi three-dimensional indication of said disturbance, and monitoring the time sequence of events on said indicator and thereby providing relatively fast and unambiguous indication of the vertical displacement of said disturbance as a precursor of its occurrence at the lower elevation angles and the surface.

32. The method as claimed in claim 22 and further including the steps of requiring the simultaneous occurrence of at least two hazard-indicating parameters on at least one elevation angle within a predesignated distance from one another and triggering an alarm when such coincidences occur.

33. The method as claimed in claim 22 and further including the step of triggering an alarm when at least one of said shear components including said radial shear and tangential shear exceeds preset thresholds simultaneously on at least two elevation angles within a prescribed distance of one another.

34. The method as claimed in claim 33 including the step of triggering an alarm when at least one of said shear components exceeds preset thresholds and appears sequentially in a succession of lower elevation angles within predetermined intervals and within prescribed distances of one another.

35. Apparatus including a Doppler radar for detecting hazardous relatively small scale weather disturbances, comprising:

means for radiating at least one Doppler radar beam toward a region of scatterers in an area of surveillance and scanning said beam in azimuth;

means for receiving echo signals from said at least one Doppler radar beam in at least first and second vertically overlapping beams from said scatterers in said first and second beams from a sequence of range bins, wherein the effective differential two way beam gain of said first and second beams is of a first polarity at all angles below a predetermined null level and of a second polarity at all angles above said null level, wherein said null level corresponds to the elevation angle at which the effective two way gain of said first beam equals that of said second beam, and wherein said first and second polarities are methematically operated upon selectively to provide first and second parameters equivalent to said first and second polarities;

means for generating the respective Doppler velocity spectra from said first and second beams from said sequence of range bins;

means for forming a composite Doppler spectrum which is a mathematical function of the Doppler spectra of said first and second beams, said composite spectrum defining the Doppler velocity domains wherein the two Doppler spectra differ in said first and second polarity senses, one of said velocity domains including two velocity bounds in the region of said composite Doppler spectrum wherein said composite spectrum has said first polarity;

means for detecting the first of said two velocity bounds as a measure of wind speed at said null level;

means for detecting the second said two velocity bounds as a measure of wind speed at a level between the height of the null level and the surface of the earth, said wind speed being defined as the radial component of the near surface wind speed;

means for measuring the near surface wind speeds in said sequence of range bins;

means for selectively determining a measure of the range derivative of the near surface wind speeds, the tangential derivative of the near surface wind speeds, the difference between the first and second velocity bounds, the difference between the mean reflectivities in said first and second beams, and generating output signals corresponding to said measure; and means for providing at least one indication of said output signals to thereby provide an indication of a weather disturbance in said area of surveillance, particularly the shear of the near surface winds including horizontal, vertical and tangential shear and the boundaries at which said shears exceed preset thresholds.

36. The apparatus as claimed in claim 35 and additionally including:

means for storing signals of predetermined hazard indicating parameters for a plurality of successive scans;

means responsive to said hazard indicating parameter signals for determining the difference between respective parameters for a sequence of successive pairs of scans and generating difference signals therefrom; and means responsive to said difference signals for indicating said difference at any location when said difference exceeds a prescribed increment, thereby providing an early warning of incipient hazardous phenomena as well as a clear pattern of the track of said phenomena and the associated evolving patterns of diverging low level winds, gust fronts, turbulence, shear and the like.

37. Apparatus including a radar system for detecting hazardous weather phenomena associated with rapidly descending events such as a downburst, comprising:

means including an antenna scanned in azimuth toward a region of scatterers for radiating at least one beam sufficiently large in vertical breadth to illuminate an area encompassed by a plurality of vertically displaced receiving beams;

means for receiving the echo powers from said plurality of receiving beams, said echo powers being representative of the average reflectivity of the scatterers in said beams;

means for determining the measure of the relationship between the echo powers between said beams at successive elevations at all range bins of said radar system, said relationship providing information representative of the vertical profile of average reflectivity of weather phenomena detected by said radar system;

means for storing a sequence of said measures for successive scans of said antenna;

means for determining the time difference of said measures; and means for generating a time history of said measures, whereby an early indication of rapidly changing reflectivities and profiles associated with a descending downburst is provided as well as a changing pattern corresponding to an evolving downburst and other weather hazards.

38. Apparatus including a Doppler radar for detecting hazardous weather phenomena comprising:

means including an antenna scanned in azimuth a region of scatterers for radiating at least one beam having a predetermined vertical breadth covering an area encompassed by a plurality of vertically stacked receiving beams;

means for receiving the echo power and corresponding reflectivities on said plurality of vertically stacked receiving beams in a predetermined number of range bins;

means for measuring the mean Doppler velocity and spectral width of the Doppler spectrum in each of said receiving beams and range bins;

means for measuring the components of the near surface winds along the direction of the beam from the mean Doppler velocity on one or more of the lower receiving beams at a sequence of relatively closely spaced azimuths;

means for determining the range derivative and the tangential derivative of said surface wind components from the means Doppler velocities at successive ranges and at said closely spaced azimuths as a measure of the radial and tangential shear, respectively, associated with the hazardous small scale phenomena such as downbursts or microbursts and tornadoes;

means for determining the locations at which the measure of the radial and tangential shear exceed adjustable preset thresholds; and means for generating alarms when either of said shears exceed said thresholds.

39. The apparatus as claimed in claim 38 and additionally including means for combining the signals corresponding to said locations at which said shears exceed said thresholds and means for reproducing the combined signals on a monitoring device to provide an essentially complete boundary and increased probability of detection of a hazardous disturbance such as a microburst.

40. The apparatus as claimed in claim 39 and additionally including means for storing the combined signals for a sequence of times and means for reproducing ssid stored signals in a predetermined playback mode to provide further enhanced detectability through motion of a coherent pattern across a clutter environment as well as mapping and tracking the motion and evolution of said hazardous disturbance and projecting its future positions.

41. The apparatus as claimed in claim 38 and additionally including means for measuring the vertical shear of the horizontal wind components in corresponding range bins of said vertically stacked receiving beams, means for generating signals corresponding to said vertical shear, means for differencing said vertical shear signals at successive times, and means for triggering an alarm and reproducing the locations when the difference between said signals exceeds a preset threshold providing thereby a potential precursor of hazardous events.

42. The apparatus as claimed in claim 41 and additionally including means for storing said vertical shear signals for a sequence of times and means for reproducing said sequence of signals in a predetermined playback mode to provide precursor signatures of hazardous events, enhanced detectability, tracking the location and evolution of said events as well as projecting their future positions.

43. The apparatus as claimed in claim 38 and additionally including means for reproducing the boundaries of the disturbance as determined on at least two elevation angles simultaneously from at least one parameter on a single indicator, means for coding each of said boundaries in a respectively distinct manner corresponding to said elevation and thereby providing a quasi three-dimensional indication of said disturbance, and means for monitoring the time sequence of events on said indicator, thereby providing relatively fast and unambiguous indication of the vertical displacement of said disturbance as a precursor of its occurrence at the lower elevation angles and the surface of the earth.

44. The apparatus as claimed in claim 38 and additionally including means for triggering an alarm when at least one of said shear components including said radial shear and tangential shear exceeds preset thresholds simultaneously on at least two elevation angles within a prescribed distance of one another.

45. The apparatus as claimed in claim 38 and additionally including means for triggering an alarm when at least one of said shear components exceeds preset thresholds and appears sequentially in a succession of lower elevation angles within predetermined intervals and within prescribed distances of one another.

46. The apparatus as claimed in claim 38 and additionally including means for determining the measure of the relationship between the echo powers between said plurality of receiving beams at successive elevation angles and at a plurality of range bins, said relationship providing information representative of the vertical profile of average reflectivity of weather phenomena detected by said radar system.

47. The apparatus as claimed in claim 46 and additionally including means for storing said measures for successive scans of said antenna; and means for retrieving and reproducing said stored measures and providing therefrom an indication of an evolving hazardous small scale phenomena.

*48. A method for detecting hazardous relatively small scale weather disturbances in an area of surveillance, comprising the steps of:*

*radiating at least one Doppler radar beam toward a region of scatterers;*

*receiving echo signals in at least first and second vertically overlapping beams from said scatterers in said first and second beams from a sequence of range bins, wherein the effective differential two way beam gain of said first and second beams is of a first polarity at all angles below a predetermined null level and a second polarity at all angles above said null level, wherein said null level corresponds to the elevation angle at which the effective two way gain of said first beam equals that of said second beam, and wherein said first and second polarities may be mathematically operated upon selectively to provide first and second parameters equivalent to said first and second polarities;*

*determining the respective Doppler velocity spectra from said first and second beams from said sequence of range bins;*

*generating a composite Doppler spectrum which is a mathematical function of the Doppler spectra of said first and second beams, said composite spectrum defining the Doppler velocity domains wherein the two Doppler spectra differ in said first and second polarity senses;*

*determining two velocity bounds in the region of said composite Doppler spectrum wherein said composite spectrum is of said first polarity;*

*generating signals identifying the first of said two velocity bounds as a measure of the wind speed component at said null level;*

*generating signals identifying the second of said two velocity bounds as a measure of wind speed at a level between the height of the null level and the surface of the earth, said wind speed being defined as the radial component of the near surface wind speed;*

*measuring the near surface wind speeds in said sequence of range bins; and*

*providing at least one indication of the variation of the near surface winds speeds with respect to range and azimuth as a signature of the weather disturbances including wind shear.*

*49. A method for detecting hazardous relatively small scale weather disturbances in an area of surveillance, comprising the steps of:*

*radiating at least one Doppler radar beam toward a region of scatterers;*

*receiving echo signals in at least first and second vertically overlapping beams from said scatterers in said first and second beams from a sequence of range bins, wherein the effective differential two way beam gain of said first and second beams is of a first polarity at all angles below a predetermined null level, and a second polarity at all angles above said null level, wherein said null level corresponds to the elevation angle at which the effective two way gain of said first beam equals that of said second beam, and wherein said first and second polarities may be mathematically operated upon selectively to provide first and second parameters equivalent to said first and second polarities;*

*determining the respective Doppler velocity spectra from said first and second beams from said sequence of range bins;*

*generating a composite Doppler spectrum which is a mathematical function of the Doppler spectra of said first and second beams, said composite spectrum defining the Doppler velocity domains wherein the two Doppler spectra differ in said first and second polarity senses;*

*generating at least one velocity parameter which is a mathematical function of said composite Doppler spectrum and which is indicative of the radial component of the wind velocity at a height corresponding to a level up to the level of said null in each of said sequence of range bins; and*

*providing an indication of the variation of said at least one velocity parameter as a function of range in said sequence of range bins as a signature of the low altitude wind shear.*

*50. The method as defined by claim 49 wherein said step of radiating comprises radiating at least one Doppler radar beam toward a region of scatterers and scanning said beam in azimuth; and*

*wherein said step of providing an indication of the variation of said at least one velocity parameter comprises providing an indication of the low altitude wind shear at the sequence of azimuths obtained by scanning said beam in azimuth.*

*51. The method as defined by claim 49 and additionally including the steps of determining the range derivative of said at least one velocity parameter and the tangential derivative of said at least one velocity parameter, and*

*generating output signals from which at least one indication of hazardous wind conditions is provided.*

*52. The method as defined by claim 49 and additionally including the steps of determining the range derivative of said at least one velocity parameter and the tangential derivative of said at least one velocity parameter, and*

*generating output signals from which at least one indication of hazardous wind conditions is provided.*

*53. The method as defined in claim 49 wherein said at least one velocity parameter comprises the mean velocity in the composite Doppler spectrum, and*

*wherein the composition Doppler spectrum comprises the difference between said first and second Doppler spectra over the velocity range corresponding to the region below said null level.*

*54. The method as defined by claim 53 wherein said velocity range corresponding to the region below said null level is determined by the velocity domain in which the difference between said Doppler spectrum of said first beam and the Doppler spectrum of said second beam is of a predetermined polarity.*

*55. The method as defined in claim 49 wherein said at least one velocity parameter comprises the route mean square velocity in the composite spectrum, and*

*wherein said composite Doppler spectrum comprises the difference between said first and second Doppler spectra over the velocity range corresponding to the region below said null level.*

*56. The method as defined by claim 49 wherein said at least one velocity parameter comprises the sum of the magnitudes of the mean Doppler velocity of a portion of said composite Doppler spectrum having a predetermined polarity and additionally including another parameter which is*

*representative of the width of said polarity portion of the composite spectrum.*

*57. A method for detecting hazardous relatively small scale weather disturbances in an area of surveillance, comprising the steps of:*

*radiating at least one Doppler radar beam toward a region of scatterers;*

*receiving echo signals in at least first and second vertically overlapping beams from said scatterers in said first and second beams from a sequence of range bins, wherein the effective differential two way beam gain of said first and second beams is of a first polarity at all angles below a predetermined null level and a second polarity at all angles above said null level, wherein said null level corresponds to the elevation angle at which the effective two way gain of said first beam equals that of said second beam, and wherein said first and second polarities may be mathematically operated upon selectively to provide first and second parameters equivalent to said first and second polarities;*

*determining a set of predetermined parameters which are functions of the mathematical characteristics of the Doppler velocity spectra corresponding to said first and second beams from said sequence of range bins;*

*operating mathematically upon said set of parameters to produce at least one parameter which is a measure of the radial wind component along the direction of the beam and which corresponds to the wind speed at a height representative of the near surface wind speed; and*

*providing at least one indication of the variation of the near surface winds speed with respect to range and azimuth as a signature of the weather disturbances including wind shear.*

* * * * *